(12) United States Patent
Hu et al.

(10) Patent No.: US 11,644,649 B2
(45) Date of Patent: May 9, 2023

(54) OPTICAL IMAGING LENS ASSEMBLY

(71) Applicant: Zhejiang Sunny Optical Co., Ltd, Ningbo (CN)

(72) Inventors: Yabin Hu, Ningbo (CN); Jianke Wenren, Ningbo (CN); Ming Li, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 379 days.

(21) Appl. No.: 16/857,728

(22) Filed: Apr. 24, 2020

(65) Prior Publication Data

US 2020/0249445 A1    Aug. 6, 2020

Related U.S. Application Data

(63) Continuation of application No. PCT/CN2019/077284, filed on Mar. 7, 2019.

(30) Foreign Application Priority Data

Apr. 28, 2018   (CN) .......................... 201810404845.5

(51) Int. Cl.
*G02B 13/00*    (2006.01)
*G02B 13/06*    (2006.01)
(Continued)

(52) U.S. Cl.
CPC ........... *G02B 13/0045* (2013.01); *G02B 9/62* (2013.01); *G02B 13/06* (2013.01); *G02B 27/0025* (2013.01)

(58) Field of Classification Search
CPC ....... G02B 13/0045; G02B 9/62; G02B 13/06
See application file for complete search history.

(56) References Cited

U.S. PATENT DOCUMENTS 9,851,532 B2   12/2017  Chen et al.
2014/0111876 A1*  4/2014  Tang ..................... G02B 13/18
                                                    359/757
(Continued)

FOREIGN PATENT DOCUMENTS

CN      203606557 U     5/2014
CN      104423019 A     3/2015
(Continued)

OTHER PUBLICATIONS

Office Action dated Jun. 14, 2021 in Indian Application No. 202047017405.
(Continued)

*Primary Examiner* — Ephrem Z Mebrahtu
(74) *Attorney, Agent, or Firm* — Sughrue Mion, PLLC

(57) ABSTRACT

The application discloses an optical imaging lens assembly including sequentially from an object side to an image side, a first lens with a positive refractive power and a convex object side surface; a second lens with a refractive power and a concave image side surface; a third lens with a refractive power; a fourth lens with a positive refractive power; a fifth lens with a negative refractive power and a concave object side surface; and a sixth lens with a negative refractive power and a concave object side surface, wherein a space interval T34 between the third lens and the fourth lens along an optical axis and a space interval T45 between the fourth lens and the fifth lens along the optical axis satisfy 0.2<T34/T45<0.6.

20 Claims, 12 Drawing Sheets

(51) Int. Cl.
G02B 9/62 (2006.01)
G02B 27/00 (2006.01)

(56) References Cited

U.S. PATENT DOCUMENTS

| | | | |
|---|---|---|---|
| 2017/0219801 A1* | 8/2017 | Chen | G02B 13/0045 |
| 2017/0315334 A1 | 11/2017 | Liao et al. | |
| 2018/0059363 A1* | 3/2018 | Kubota | G02B 9/62 |
| 2018/0129020 A1* | 5/2018 | Teraoka | G02B 9/62 |

FOREIGN PATENT DOCUMENTS

| | | |
|---|---|---|
| CN | 105589181 A | 5/2016 |
| CN | 106646833 A | 5/2017 |
| CN | 106990511 A | 7/2017 |
| CN | 108333723 A | 7/2018 |
| CN | 208477184 U | 2/2019 |
| JP | 2000-284184 A | 10/2000 |
| KR | 10-1690479 B1 | 12/2016 |
| WO | 2014/162779 A1 | 10/2014 |

OTHER PUBLICATIONS

International Search Report for PCT/CN2019/077284, dated May 29, 2019.

* cited by examiner

OPTICAL IMAGING LENS ASSEMBLY

CROSS-REFERENCE TO RELATED APPLICATIONS

The present patent application is a continuation of International Application No. PCT/CN2019/077284, filed on Mar. 7, 2019, which claims priority from Chinese Patent Application No. 201810404845.5, filed on Apr. 28, 2018 before the China National Intellectual Property Administration. Both of the aforementioned patent applications are hereby incorporated by reference in their entireties.

TECHNICAL FIELD

The disclosure relates to an optical imaging lens assembly, in particular an optical imaging lens assembly consisting of six lenses.

BACKGROUND

In recent years, with the popularization of portable electronic products, such as smartphones, and the improvement of consumers' perception, the renewal cycle of the products becomes shorter and shorter, and the consumers has made higher and higher requirements for the imaging function of electronic products. Accordingly, it raises higher requirements on the optical performance of the imaging camera and the hardware conditions of the electronic coupling device or the complementary metal oxide semiconductor image sensor. In particular, the concept of double photographing has been recently proposed for photographing, that is, the optical zoom is performed by combining two optical lenses with image processing algorithm. In the double-shot camera, one of sub-cameras is a telephoto camera with the characteristics of large magnification, small depth of field and the like, which are beneficial to blur the background to obtain better shooting effect. At the same time, given that the high imaging quality is satisfied, the shorter the optical length of the optical cameral is, the more beneficial to miniaturize the electronic products it is.

Therefore, the present disclosure proposes a telephoto optical imaging lens assembly suitable for the portable electronic products and with a long focal length and a good imaging quality.

SUMMARY

To solve at least one of the problems in the prior art, the disclosure provides an optical imaging lens assembly.

One aspect of the disclosure provides an optical imaging lens assembly including sequentially from an object side to an image side, a first lens with a positive refractive power and a convex object side surface; a second lens with a refractive power and a concave image side surface; a third lens with a refractive power; a fourth lens with a positive refractive power; a fifth lens with a negative refractive power and a concave object side surface; and a sixth lens with a negative refractive power and a concave object side surface, wherein a space interval T34 between the third lens and the fourth lens along an optical axis and a space interval T45 between the fourth lens and the fifth lens along the optical axis satisfy $0.2<T34/T45<0.6$.

According to an embodiment of the disclosure, half of a maximum field of view HFOV of the optical imaging lens assembly satisfies $HFOV \leq 25°$.

According to an embodiment of the disclosure, an effective focal length f5 of the fifth lens and an effective focal length f6 of the sixth lens satisfy $1 \leq f5/f6 < 4$.

According to an embodiment of the disclosure, a space interval T56 between the fifth lens and the sixth lens along the optical axis and a sum $\Sigma AT$ of space intervals along the optical axis between any two adjacent lenses having refractive power among the first lens to the sixth lens satisfy $T56/\Sigma AT<0.6$.

According to an embodiment of the disclosure, an effective focal length f1 of the first lens, an effective focal length f2 of the second lens, an effective focal length f3 of the third lens, and an effective focal length f4 of the fourth lens satisfy $|1/f2+1/f3|/|1/f1+1/f4|<1$.

According to an embodiment of the disclosure, a curvature radius R9 of the object side surface of the fifth lens, a curvature radius R10 of an image side surface of the fifth lens, a curvature radius R11 of the object side surface of the sixth lens, and the curvature radius R12 of an image side surface of the sixth lens satisfy $-1<(R9+R10)/(R11+R12)<3$.

According to an embodiment of the disclosure, a maximum effective radius SD12 of an image side surface of the first lens and a maximum effective radius SD52 of an image side surface of the fifth lens satisfy $0.5<SD12/SD52<1$.

According to an embodiment of the disclosure, a curvature radius R1 of the object side surface of the first lens and a curvature radius R2 of an image side surface of the first lens satisfy $-1.5<(R1+R2)/(R1-R2)<-0.5$.

According to an embodiment of the disclosure, a distance TTL along the optical axis from the object side surface of the first lens to an imaging surface and an effective focal length f of the optical imaging system satisfy $TTL/f<1$.

According to an embodiment of the disclosure, $(|SAG11+SAG22|+|SAG51+SAG61|)/TD<0.5$ is satisfied, where SAG11 is a distance along the optical axis from an intersection of the object side surface of the first lens and the optical axis to a vertex of a maximum effective radius of the object side surface of the first lens, SAG22 is a distance along the optical axis from an intersection of the image side surface of the second lens and the optical axis to a vertex of a maximum effective radius of the image side surface of the second lens, SAG51 is a distance along the optical axis from an intersection of the object side surface of the fifth lens and the optical axis to a vertex of a maximum effective radius of the object side surface of the fifth lens, SAG61 is a distance along the optical axis from an intersection of the object side surface of the sixth lens and the optical axis to a vertex of a maximum effective radius of the object side surface of the sixth lens, and TD is a distance between the object side surface of the first lens to an image side surface of the sixth lens along the optical axis.

According to an embodiment of the disclosure, an effective focal length f1 of the first lens, an effective focal length f4 of the fourth lens, and an effective focal length f6 of the sixth lens satisfy $-3\ mm<f1*f6/f4<-0.5\ mm$.

According to an embodiment of the disclosure, a central thickness CT1 of the first lens, a central thickness CT2 of the second lens, a central thickness CT3 of the third lens, and a central thickness CT5 of the fifth lens satisfy $(CT2+CT3)/(CT1+CT5)<0.6$.

According to an embodiment of the disclosure, an effective focal length f of the optical imaging lens assembly, a curvature radius R4 of the image side surface of the second lens, and a curvature radius R5 of an object side surface of the third lens satisfy $-1<f/R4-f/R5<0$.

One aspect of the disclosure provides an optical imaging lens assembly including sequentially from an object side to an image side, a first lens with a positive refractive power and a convex object side surface; a second lens with a refractive power and a concave image side surface; a third lens with a refractive power; a fourth lens with a positive refractive power; a fifth lens with a negative refractive power and a concave object side surface; and a sixth lens with a negative refractive power and a concave object side surface, wherein (|SAG11+SAG22|+|SAG51+SAG61|)/TD<0.5 is satisfied, where SAG11 is a distance along the optical axis from an intersection of the object side surface of the first lens and the optical axis to a vertex of a maximum effective radius of the object side surface of the first lens, SAG22 is a distance along the optical axis from an intersection of the image side surface of the second lens and the optical axis to a vertex of a maximum effective radius of the image side surface of the second lens, SAG51 is a distance along the optical axis from an intersection of the object side surface of the fifth lens and the optical axis to a vertex of a maximum effective radius of the object side surface of the fifth lens, SAG61 is a distance along the optical axis from an intersection of the object side surface of the sixth lens and the optical axis to a vertex of a maximum effective radius of the object side surface of the sixth lens, and TD is a distance between the object side surface of the first lens to an image side surface of the sixth lens along the optical axis.

One aspect of the disclosure provides an optical imaging lens assembly including sequentially from an object side to an image side, a first lens with a positive refractive power and a convex object side surface; a second lens with a refractive power and a concave image side surface; a third lens with a refractive power; a fourth lens with a positive refractive power; a fifth lens with a negative refractive power and a concave object side surface; and a sixth lens with a negative refractive power and a concave object side surface, wherein an effective focal length f of the optical imaging lens assembly, a curvature radius R4 of the image side surface of the second lens, and a curvature radius R5 of an object side surface of the third lens satisfy −1<f/R4−f/R5<0.

One aspect of the disclosure provides an optical imaging lens assembly including sequentially from an object side to an image side, a first lens with a positive refractive power and a convex object side surface; a second lens with a refractive power and a concave image side surface; a third lens with a refractive power; a fourth lens with a positive refractive power; a fifth lens with a negative refractive power and a concave object side surface; and a sixth lens with a negative refractive power and a concave object side surface, wherein a maximum effective radius SD12 of an image side surface of the first lens and a maximum effective radius SD52 of an image side surface of the fifth lens satisfy 0.5<SD12/SD52<1.

The optical imaging lens assembly of the disclosure is applicable to portable electronic products, and is a telephoto optical imaging lens assembly with a long focal length and a good imaging quality.

BRIEF DESCRIPTION TO THE DRAWINGS

Other features, objects and advantages of the disclosure will become more apparent from the following detailed description of non-limiting embodiments in conjunction with the accompanying drawings, in which.

DETAILED DESCRIPTION OF EMBODIMENTS

Figure 1:
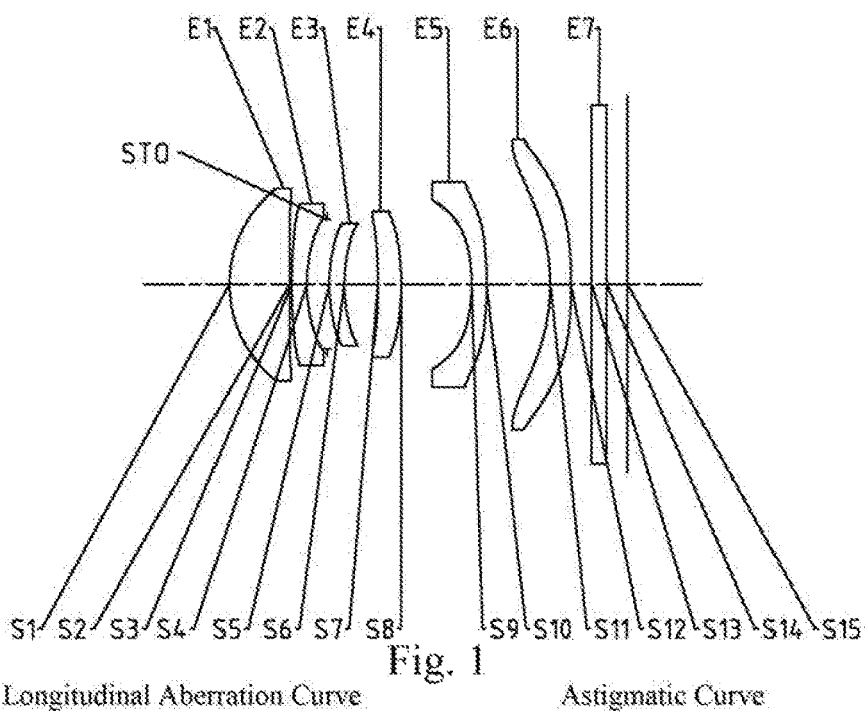
FIG. 1 shows a schematic structural diagram of an optical imaging lens assembly of Example 1.

Further details of the disclosure are described below with reference to the accompanying drawings and embodiments. It is understood that the specific embodiments described herein are used merely for explaining the related invention and should not be interpreted to be any limit to the invention. It should also be noted that, for ease of description, only the relevant parts of the disclosure are shown in the drawings.

It should be understood that in the disclosure, when an element or layer is described as being "on," "connected to," or "coupled to" another element or layer, it may be disposed directly on the another element or layer, directly connected or coupled to the another element or layer, or there may present an intermediate element or layer therebetween. When an element is referred to as being "directly on" another element or layer, "directly connected to" or "directly coupled to" another element or layer, there is no intermediate element or layer. Throughout the specification, the same reference numerals refer to the same elements. As used herein, the expression "and/or" includes any one of or any combination of the listed items.

It should be understood that while the terms 1st, 2nd or first, second, etc., may be used therein to modify various elements, components, regions, layers and/or segments, these elements, components, regions, layers and/or segments should not be limited by these terms. These terms are used merely for distinguishing one component, component, region, layer or segment from another component, component, region, layer or segment. Therefore, without departing from the teachings of the disclosure, a first element, component, region, layer or segment discussed below may be referred to as a second element, component, region, layer or segment.

The terms used herein are used merely for the purpose of describing specific embodiments and are not intended to limit the disclosure. As used herein, features that do not be specifically limited as a singular or plural form does not exclude the plural form unless explicitly indicated in the context. It should also be understood that the terms "include," "including," "having," "comprise," and/or "comprising" when used in this specification indicate the presence of stated features, integrals, steps, operations, elements and/or components, but do not exclude the presence or addition of one or more other features, integrals, steps, operations, elements, components and/or combinations thereof. As used herein, the expression "and/or" includes any one of or any combination of the listed items. The expressions such as "at least one of . . . " preceding a list of features modify the entire list of features rather than an individual element in the list. Further, the use of "may," when describing implementations of the disclosure, refers to "one or more implementations of the disclosure." Also, the term "exemplary" is intended to refer to an example or illustration.

Unless otherwise defined, all terms (including technical and scientific terms) used herein have the same meaning as commonly understood by those of ordinary skill in the art to which the disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly defined as that herein.

It should be noted that the embodiments of the disclosure and the features of the embodiments may be combined without conflict. The disclosure will be described in detail below with reference to the accompanying drawings and in conjunction with the embodiments.

The disclosure provides an optical imaging lens assembly including sequentially from an object side to an image side, a first lens with a positive refractive power and a convex object side surface; a second lens with a refractive power and a concave image side surface; a third lens with a refractive power; a fourth lens with a positive refractive power; a fifth lens with a negative refractive power and a concave object side surface; and a sixth lens with a negative refractive power and a concave object side surface.

According to an embodiment of the disclosure, (|SAG11|+SAG22|+|SAG51+SAG61|)/TD<0.5 is satisfied, where SAG11 is a distance along an optical axis from an intersection of the object side surface of the first lens and the optical axis to a vertex of a maximum effective radius of the object side surface of the first lens, SAG22 is a distance along the optical axis from an intersection of the image side surface of the second lens and the optical axis to a vertex of a maximum effective radius of the image side surface of the second lens, SAG51 is a distance along the optical axis from an intersection of the object side surface of the fifth lens and the optical axis to a vertex of a maximum effective radius of the object side surface of the fifth lens, SAG61 is a distance along the optical axis from an intersection of the object side surface of the sixth lens and the optical axis to a vertex of a maximum effective radius of the object side surface of the sixth lens, and TD is a distance between the object side surface of the first lens to an image side surface of the sixth lens along the optical axis. By satisfying the above conditions, the bending shapes of the first lens, the second lens, the fifth lens and the sixth lens can be controlled, so that the lenses have the characteristic of symmetrical double Gaussian, which is beneficial to the correction of the off-axis aberrations such as coma aberration and astigmatism.

According to an embodiment of the disclosure, half of a maximum field of view HFOV of the optical imaging lens assembly satisfies HFOV≤25°, more specifically, HFOV≤23.3°. By satisfying the above-mentioned relation, the field of view of the system can be controlled to be less than 50°. Given that the imaging plane of the sensor have a certain size, the longer the focal length of the optical system is, the larger the magnification ratio is, the smaller the depth of field is, and more beneficial for the lens assembly to capturing the blurred scene.

According to an embodiment of the disclosure, an effective focal length f5 of the fifth lens and an effective focal length f6 of the sixth lens satisfy 1≤f5/f6<4, more specifically 1.00 f5/f63≤30. By satisfying the above-mentioned relation, the ratio between the refractive powers of the fifth lens and the sixth lens can be controlled. Both of the lenses have negative refractive powers and can maintain the long-focus characteristics by appropriately diverging the light. In addition, the field curvature can be corrected to achieve a good imaging effect.

According to an embodiment of the disclosure, a space interval T56 between the fifth lens and the sixth lens along the optical axis and a sum ΣAT of space intervals along the optical axis between any two adjacent lenses having the refractive power among the first lens to the sixth lens satisfy T56/ΣAT<0.6, more specifically satisfy T56/ΣAT≤0.51. By satisfying the above relation, the distance between the fifth lens and the sixth lens along the axis can be restrained appropriately, the light can be diverged effectively after passing through the fifth lens, and the two lenses compensate the corresponding third-order distortion aberration to enable the system to control the distortion appropriately.

According to an embodiment of the disclosure, an effective focal length f1 of the first lens, an effective focal length f2 of the second lens, an effective focal length f3 of the third lens, and an effective focal length f4 of the fourth lens satisfy |1/f2+1/f3|/|1/f1+1/f4|<1, more specifically, |1/f2+1/f3|/|1/f1+1/f4|≤0.63. By satisfying the above-mentioned relation, the refractive powers of the four lenses of the optical imaging system can be distributed appropriately to enable the first lens and the fourth lens to undertake more refractive powers, so that the first lens and the fourth lens can correct the spherical aberration and the sagittal astigmatism.

According to an embodiment of the disclosure, a curvature radius R9 of the object side surface of the fifth lens, a curvature radius R10 of an image side surface of the fifth lens, a curvature radius R11 of the object side surface of the sixth lens, and the curvature radius R12 of an image side surface of the sixth lens satisfy −1<(R9+R10)/(R11+R12)<3, more specifically −0.54≤(R9+R10)/(R11+R12)≤2.67. By satisfying the above-mentioned relation, the curvature radii of the fifth lens and the sixth lens can be controlled to make them bending toward the stop so as to reduce the incident angle of the chief ray at the surfaces of these two lenses. In such a case, the astigmatisms caused by the surfaces of the two lenses are substantially compensated to ensure tolerance stability of the system.

According to an embodiment of the disclosure, a maximum effective radius SD12 of an image side surface of the first lens and a maximum effective radius SD52 of an image side surface of the fifth lens satisfy 0.5<SD12/SD52<1, more specifically, 0.81 SD12/SD52 By satisfying the above relation, the effective radius of the image side surface of the first lens and the effective radius of the image side surface of the fifth lens can be restrained. On the one hand, the light in the internal field of view is blocked, and the off-axis comet aberration can be reduced by reducing the diameter. On the other hand, the relative illuminance is kept within the reasonable range by blocking the light in the external field of view.

According to an embodiment of the disclosure, a curvature radius R1 of the object side surface of the first lens and a curvature radius R2 of an image side surface of the first lens satisfy −1.5<(R1+R2)/(R1−R2)<−0.5, more specifically −1.37≤(R1+R2)/(R1−R2)≤−0.73. By satisfying the above relation, the curvature radius of the object side surface of the first lens and the curvature radius of the image side surface of the first lens can be controlled to restrain the refractive power thereof in a certain range, so as to correct the meridional astigmatism and the off-axis coma aberration.

According to an embodiment of the disclosure, a distance TTL along an optical axis from the object side surface of the first lens to an imaging surface and an effective focal length f of the optical imaging system satisfy TTL/f<1, more specifically, TTL/f≤0.93. By satisfying the above relation, the distance along the optical axis from the object side surface of the first lens to the imaging surface is controlled to be less than the effective focal length of the optical imaging system. On the one hand, the size of the system is reduced. On the other hand, the focal length is increased to achieve the characteristics of a large magnification and a small depth of field.

According to an embodiment of the disclosure, a space interval T34 between the third lens and the fourth lens along an optical axis and a space interval T45 between the fourth lens and the fifth lens along the optical axis satisfy 0.2<T34/T45<0.6, more specifically, 0.32≤T34/T45≤0.55. By satisfying the above-mentioned relation, the space interval between the third lens and the fourth lens along the optical axis and the space interval between the fourth lens and the fifth lens along the optical axis are adjusted appropriately. The fourth lens is close to the third lens, so that the high/low refractive indexes of the two lenses can cooperate with each other to correct chromatic aberration. Meanwhile, the fifth lens is far away from the fourth lens, so that the Petzval field curvature and the distortion may be corrected.

According to an embodiment of the disclosure, an effective focal length f1 of the first lens, an effective focal length f4 of the fourth lens, and an effective focal length f6 of the sixth lens satisfy −3 mm<f1*f6/f4<−0.5 mm, more specifically, −2.90 mm≤f1*f6/f4≤−0.75 mm. By satisfying the above-mentioned relation, the positive refractive powers of the first lens and the fourth lens and the negative refractive power of the sixth lens can be controlled, so that the light incident on the first lens is converged to achieve a large deflection, and the light is appropriately diffused by the sixth lens after being converged by the fourth lens. In such a case, the light goes through a moderate deflection process, so that the tolerance stability of the system is ensured while the spherical aberration is corrected.

According to an embodiment of the disclosure, a central thickness CT1 of the first lens, a central thickness CT2 of the second lens, a central thickness CT3 of the third lens, and a central thickness CT5 of the fifth lens satisfy (CT2+CT3)/(CT1+CT5)<0.6, more specifically (CT2+CT3)/(CT1+CT5)≤0.56. By satisfying the above-mentioned relation, the central thickness of the first lens, the central thickness of the second lens, the central thickness of the third lens, and the central thickness of the fifth lens can be appropriately controlled to restrict the distribution of the refractive powers of the four lenses, and the lens forming process can meet the process requirements under the condition of ensuring the total optical length.

According to an embodiment of the disclosure, an effective focal length f of the optical imaging lens assembly, a curvature radius R4 of the image side surface of the second lens, and a curvature radius R5 of an object side surface of the third lens satisfy −1<f/R4−f/R5<0, more specifically, −0.78≤f/R4−f/R5≤−0.07. By satisfying the above relation, the ratio between the curvature radius of the image side surface of the second lens and the effective focal length as well as the ratio between the curvature radius of the object side surface of the third lens and the effective focal length can be controlled to make the shapes of the two surfaces to be similar with each other, which is beneficial to the correction to the lateral color curve by the cooperation of the high/low refractive indexes of the two lenses.

The disclosure is further described below with reference to specific examples.

Example 1

First, an optical imaging lens assembly according to Example 1 of the disclosure is described with reference to FIGS. 1 to 5.

FIG. 1 is a schematic structural diagram showing the optical imaging lens assembly of Example 1. As shown in FIG. 1, the optical imaging lens assembly includes six lenses. The six lenses are a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, and a sixth lens E6 having an object side surface S11 and an image side surface S12, respectively. The first lens E1 to the sixth lens E6 are sequentially disposed from an object side to an image side of the optical imaging lens assembly.

The first lens E1 may have a positive refractive power. The object side surface S1 of the first lens E1 may be convex and the image side surface S2 of the first lens E1 is concave. The second lens E2 may have a negative refractive power. The object side surface S3 of the second lens E2 may be convex and the image side surface S4 of the second lens E2 may be concave. The third lens E3 may have a positive refractive power. The object side surface S5 of the third lens E3 may be convex, and the image side surface S6 of the third lens E3 may be concave. The fourth lens E4 may have a positive refractive power. The object side surface S7 of the fourth lens E4 may be concave, and the image side surface S8 of the fourth lens E4 may be convex. The fifth lens E5 may have a negative refractive power. The object side surface S9 of the fifth lens E5 may be concave, and the image side surface S10 of the fifth lens E5 may be convex. The sixth lens E6 may have a negative refractive power. The object side surface S11 of the sixth lens E6 may be concave, and the image side surface S12 of the sixth lens E6 may be convex.

The optical imaging lens assembly further includes a filter E7 having an object side surface S13 and an image side surface S14 for filtering infrared light. In this example, the light from the object passes through the surfaces S1 to S14 in sequence and is finally imaged on the imaging surface S15.

In this example, the first lens E1 to the sixth lens E6 have effective focal lengths f1 to f6, respectively. The first lens E1 to the sixth lens E6 are sequentially arranged along the optical axis and collectively determine the total effective focal length f of the optical imaging lens assembly. Table 1 below shows the effective focal lengths f1 to f6 of the first lens E1 to the sixth lens E6, the total effective focal length f of the optical imaging lens assembly, a total length TTL (mm) of the optical imaging lens assembly, and half of a diagonal length ImgH of an effective pixel region on an electronic photosensitive element.

TABLE 1

| f1 (mm) | 3.12 | f (mm) | 6.00 |
|---|---|---|---|
| f2 (mm) | −5.08 | TTL (mm) | 5.51 |
| f3 (mm) | 440.92 | ImgH (mm) | 2.62 |
| f4 (mm) | 11.16 | | |

TABLE 1-continued

| f5 (mm) | −9.63 |
|---|---|
| f6 (mm) | −7.70 |

Table 2 shows the surface type, curvature radius, thickness, refractive index, abbe number, and conical coefficient of each lens in the optical imaging lens assembly of this example, wherein both the curvature radius and the thickness are expressed in millimeters (mm).

TABLE 2

| | | | | Material | | |
|---|---|---|---|---|---|---|
| Surface No. | Surface Type | Curvature Radius | Thickness | Refractive Index | Abbe Number | Conic Coefficient |
| OBJ | Spherical | Infinite | Infinite | | | |
| S1 | Aspherical | 1.6786 | 0.8353 | 1.55 | 56.1 | 0.0634 |
| S2 | Aspherical | 95.3012 | 0.0300 | | | 99.0000 |
| S3 | Aspherical | 6.3737 | 0.2100 | 1.67 | 20.4 | 7.9293 |
| S4 | Aspherical | 2.1842 | 0.2789 | | | 0.5036 |
| STO | Spherical | Infinite | 0.0300 | | | |
| S5 | Aspherical | 2.1435 | 0.2100 | 1.55 | 56.1 | −0.3843 |
| S6 | Aspherical | 2.0879 | 0.4695 | | | 0.2045 |
| S7 | Aspherical | −7.4622 | 0.3225 | 1.65 | 23.5 | −33.2814 |
| S8 | Aspherical | −3.7281 | 0.9690 | | | 1.6424 |
| S9 | Aspherical | −2.4937 | 0.2100 | 1.55 | 56.1 | 3.0181 |
| S10 | Aspherical | −4.8812 | 0.8728 | | | 3.9027 |
| S11 | Aspherical | −2.7998 | 0.2878 | 1.55 | 56.1 | −0.3171 |
| S12 | Aspherical | −8.6801 | 0.2870 | | | 0.7174 |
| S13 | Spherical | Infinite | 0.2100 | 1.52 | 64.2 | |
| S14 | Spherical | Infinite | 0.2872 | | | |
| S15 | Spherical | Infinite | | | | |

In this example, each lens may use aspherical lens, and the shape of each of the aspherical surfaces x is limited by the following formula:

$$x = \frac{ch^2}{1+\sqrt{1-(k+1)c^2h^2}} + \sum A_i h^i \quad (1)$$

Here, x is the sag—axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the curvature radius in the above Table 2); k is the conic coefficient (shown in the above Table 2); and Ai is a correction coefficient for the i-th order of the aspheric surface.

Table 3 below shows the high-order coefficients of each of the aspherical surfaces S1-S12 that can be used for respective aspherical lens in this example.

TABLE 3

| Surface No. | A4 | A6 | A8 | A10 | A12 | A14 | A16 |
|---|---|---|---|---|---|---|---|
| S1 | −4.2582E−03 | 1.6825E−03 | −8.0995E−03 | 1.6796E−02 | −1.8409E−02 | 8.6347E−03 | −1.5101E−03 |
| S2 | −3.6170E−02 | 1.7683E−01 | −3.7406E−01 | 4.2390E−01 | −2.5831E−01 | 8.0110E−02 | −9.9525E−03 |
| S3 | −6.0464E−02 | 1.6820E−01 | −3.3883E−01 | 3.9113E−01 | −1.9181E−01 | 1.6188E−02 | 8.8062E−03 |
| S4 | −2.1117E−02 | 5.8446E−03 | 3.2881E−02 | 7.0466E−02 | −5.0782E−02 | 8.6680E−02 | −8.4582E−02 |
| S5 | −3.0383E−02 | −1.0942E−01 | 3.3132E−01 | −3.2102E−01 | 5.1192E−01 | −4.2698E−01 | 1.0402E−01 |
| S6 | −3.3342E−02 | −9.4929E−02 | 1.9978E−01 | 1.9881E−01 | −6.3976E−01 | 9.0328E−01 | −4.6928E−01 |
| S7 | −2.0375E−02 | 8.5357E−03 | −2.1299E−01 | 5.5531E−01 | −7.2471E−01 | 5.0316E−01 | −1.3675E−01 |
| S8 | −9.0181E−05 | −2.5674E−02 | −2.4324E−02 | 1.0278E−02 | 6.5402E−02 | −9.9224E−02 | 4.4117E−02 |
| S9 | 2.5048E−02 | −1.4811E−01 | 4.9647E−02 | 5.1803E−02 | −8.3869E−02 | 3.2472E−02 | 4.0855E−03 |

TABLE 3-continued

| Surface No. | A4 | A6 | A8 | A10 | A12 | A14 | A16 |
|---|---|---|---|---|---|---|---|
| S10 | 5.5949E−02 | −1.5161E−01 | 1.1723E−01 | −5.3687E−02 | 1.0791E−02 | 2.8484E−03 | −1.1526E−03 |
| S11 | 2.5343E−03 | −8.7484E−03 | 1.2141E−02 | −6.5424E−03 | 2.0560E−03 | −3.3183E−04 | 2.1208E−05 |
| S12 | −5.6017E−02 | 1.0688E−02 | −1.0734E−03 | 2.5977E−04 | −8.9456E−05 | 5.0073E−06 | 1.4183E−06 |

Figure 2:
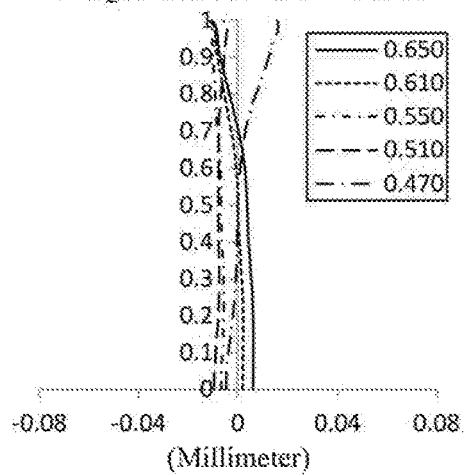
FIGS. 2 to 5 show a longitudinal aberration curve, an astigmatic curve, a distortion curve and a lateral color curve of the optical imaging lens assembly of Example 1, respectively.
Figure 3:
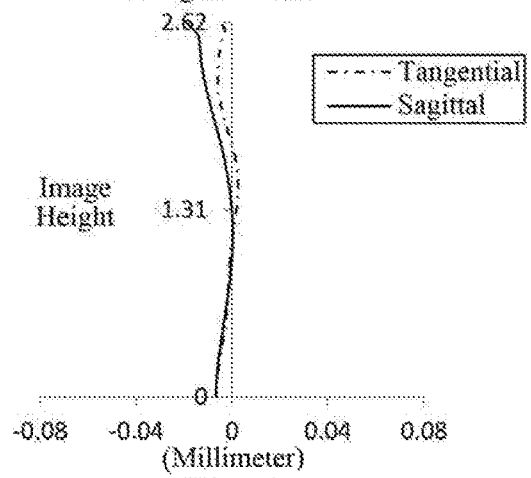
Figure 4:
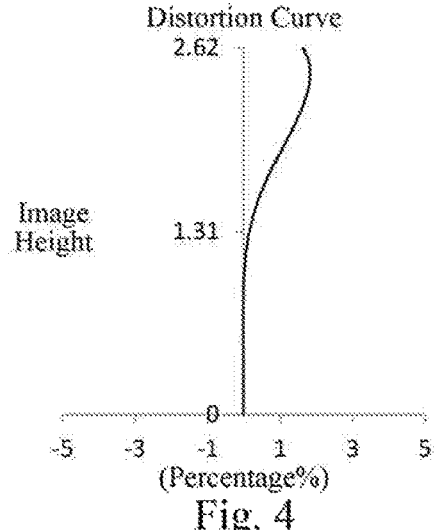
Figure 5:
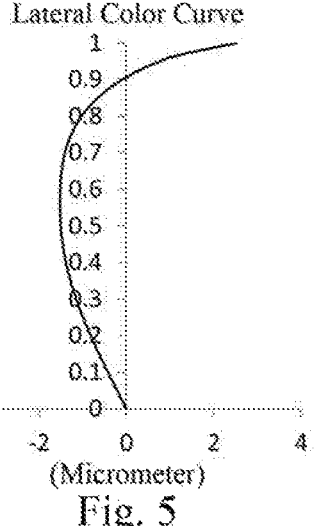

FIG. 2 illustrates a longitudinal aberration curve of the optical imaging system according to Example 1, representing deviations of focal points converged by light of different wavelengths after passing through the optical imaging system. FIG. 3 illustrates an astigmatic curve of the optical imaging system according to Example 1, representing a curvature of a tangential plane and a curvature of a sagittal plane. FIG. 4 illustrates a distortion curve of the optical imaging system according to Example 1, representing amounts of distortion corresponding to different FOVs. FIG. 5 illustrates a lateral color curve of the optical imaging system according to Example 1, representing deviations of different image heights on an image plane after light passes through the optical imaging system. It can be determined from the above description and FIGS. 2 to 5 that the optical imaging lens assembly according to Example 1 is applicable for portable electronic products, and is a telephoto optical imaging lens assembly with a long focal length and a good imaging quality.

Example 2

An optical imaging lens assembly according to Example 2 of the disclosure is described below with reference to FIGS. 6 to 10.

Figure 6:
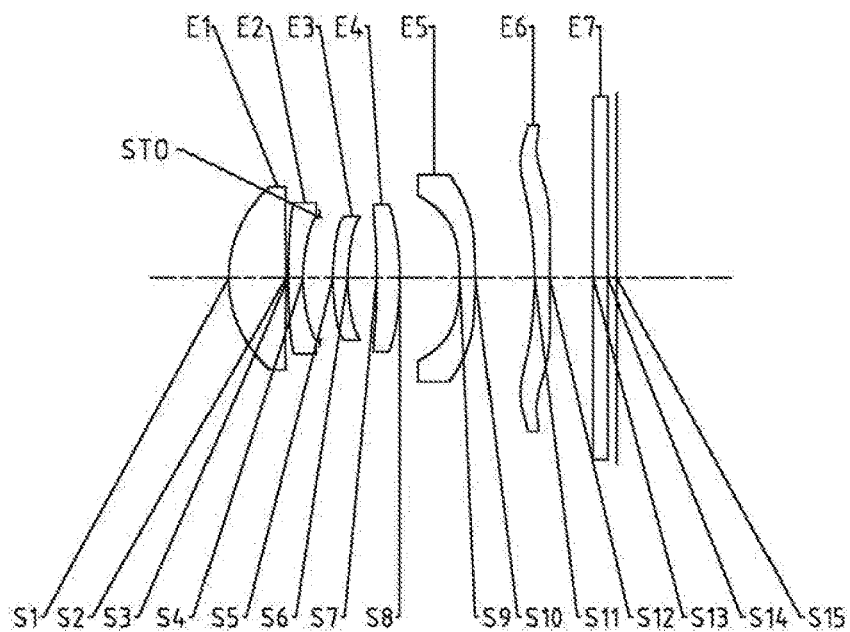
FIG. 6 shows a schematic structural diagram of an optical imaging lens assembly of Example 2.

FIG. 6 is a schematic structural diagram showing the optical imaging lens assembly of Example 2. As shown in FIG. 6, the optical imaging lens assembly includes six lenses. The six lenses are a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, and a sixth lens E6 having an object side surface S11 and an image side surface S12, respectively. The first lens E1 to the sixth lens E6 are sequentially disposed from an object side to an image side of the optical imaging lens assembly.

The first lens E1 may have a positive refractive power. The object side surface S1 of the first lens E1 may be convex, and the image side surface S2 of the first lens E1 is convex. The second lens E2 may have a negative refractive power. The object side surface S3 of the second lens E2 may be convex and the image side surface S4 of the second lens E2 may be concave. The third lens E3 may have a negative refractive power. The object side surface S5 of the third lens E3 may be convex, and the image side surface S6 of the third lens E3 may be concave. The fourth lens E4 may have a positive refractive power. The object side surface S7 of the fourth lens E4 may be concave, and the image side surface S8 of the fourth lens E4 may be convex. The fifth lens E5 may have a negative refractive power. The object side surface S9 of the fifth lens E5 may be concave, and the image side surface S10 of the fifth lens E5 may be convex. The sixth lens E6 may have a negative refractive power. The object side surface S11 of the sixth lens E6 may be concave, and the image side surface S12 of the sixth lens E6 may be concave.

Table 4 below shows effective focal lengths f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 4

| f1 (mm) | 2.96 | f (mm) | 5.88 |
|---|---|---|---|
| f2 (mm) | −5.43 | TTL (mm) | 5.49 |
| f3 (mm) | −24.19 | ImgH (mm) | 2.62 |
| f4 (mm) | 9.38 | | |
| f5 (mm) | −9.82 | | |
| f6 (mm) | −6.51 | | |

Table 5 shows the surface type, curvature radius, thickness, refractive index, abbe number, and conic coefficient of each lens in the optical imaging lens assembly of this example, wherein both the curvature radius and the thickness are expressed in millimeters (mm).

TABLE 5

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| S1 | Aspherical | 1.6904 | 0.8162 | 1.55 | 56.1 | 0.0201 |
| S2 | Aspherical | −31.3690 | 0.0307 | | | 97.7130 |
| S3 | Aspherical | 8.1048 | 0.2100 | 1.67 | 20.4 | −4.6380 |
| S4 | Aspherical | 2.4778 | 0.2328 | | | −0.1535 |
| STO | Spherical | Infinite | 0.1906 | | | |
| S5 | Aspherical | 3.2006 | 0.2100 | 1.55 | 56.1 | −0.3860 |
| S6 | Aspherical | 2.5168 | 0.4084 | | | 0.2742 |
| S7 | Aspherical | −16.5836 | 0.3312 | 1.65 | 23.5 | 96.4057 |
| S8 | Aspherical | −4.4699 | 0.8422 | | | −1.1366 |
| S9 | Aspherical | −3.0100 | 0.2170 | 1.55 | 56.1 | 3.3582 |
| S10 | Aspherical | −7.0314 | 0.8348 | | | 19.3121 |
| S11 | Aspherical | −4.2187 | 0.2135 | 1.55 | 56.1 | −55.7710 |
| S12 | Aspherical | 22.9826 | 0.6178 | | | 93.8415 |
| S13 | Spherical | Infinite | 0.2100 | 1.52 | 64.2 | |
| S14 | Spherical | Infinite | 0.1249 | | | |
| S15 | Spherical | Infinite | | | | |

Table 6 below shows the high-order coefficients of each of the aspherical surfaces S1-S12 that can be used for respective aspherical lens in this example. Each aspherical surface type may be defined by formula (1) given in Example 1 above.

TABLE 6

| Surface No. | A4 | A6 | A8 | A10 | A12 | A14 | A16 |
|---|---|---|---|---|---|---|---|
| S1 | −8.4393E−03 | 1.3731E−02 | −2.4261E−02 | 2.1755E−02 | −1.1896E−02 | 3.6046E−03 | −4.4607E−04 |
| S2 | −4.7433E−02 | 1.0747E−01 | −1.0010E−01 | 7.2620E−02 | −4.3307E−02 | 1.6063E−02 | −2.4856E−03 |
| S3 | −6.5162E−02 | 7.3091E−02 | 3.2666E−02 | −4.9413E−02 | 6.2046E−03 | 1.3994E−03 | 1.6088E−03 |
| S4 | 8.8388E−03 | −2.3213E−01 | 1.2838E+00 | −3.2303E+00 | 5.0182E+00 | −4.2059E+00 | 1.4413E+00 |
| S5 | −5.6504E−02 | −3.9414E−02 | 3.8597E−01 | −2.9225E−01 | 2.5410E−01 | −2.5592E−01 | 1.1155E−01 |
| S6 | −6.4066E−02 | −1.5504E−01 | 9.1546E−01 | −1.7113E+00 | 2.4373E+00 | −1.9575E+00 | 6.7713E−01 |
| S7 | −2.9310E−02 | 3.0508E−02 | −2.3349E−01 | 6.0361E−01 | −6.8613E−01 | 4.1244E−01 | −1.0712E−01 |
| S8 | −9.2641E−03 | −7.7007E−02 | 1.3347E−01 | −1.6499E−01 | 1.4442E−01 | −6.6491E−02 | 1.1892E−02 |
| S9 | −6.4202E−02 | 1.8319E−01 | −1.3221E+00 | 2.4458E+00 | −2.1906E+00 | 9.6758E−01 | −1.6710E−01 |
| S10 | 1.1944E−01 | −3.6848E−01 | 3.2879E−01 | −1.3981E−01 | 2.7710E−02 | −1.4204E−03 | −1.5485E−04 |
| S11 | 3.7005E−02 | −7.6181E−02 | 3.4597E−02 | −2.4934E−03 | −1.6659E−03 | 4.1643E−04 | −2.9745E−05 |
| S12 | −1.5392E−02 | −2.6573E−02 | 4.9287E−03 | 3.2651E−03 | −1.1529E−03 | 1.2741E−04 | −4.7118E−06 |

Figure 7:
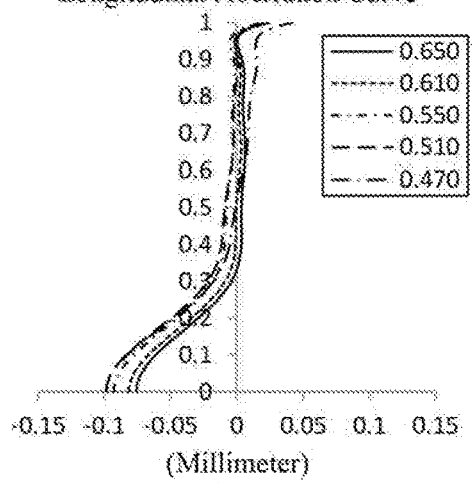
FIGS. 7 to 10 show a longitudinal aberration curve, an astigmatic curve, a distortion curve and a lateral color curve of the optical imaging lens assembly of Example 2, respectively.
Figure 8:
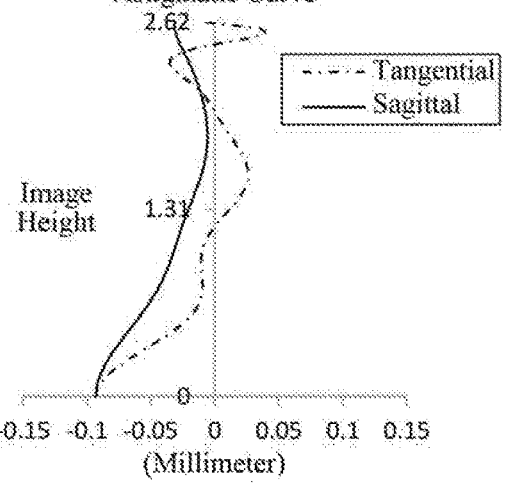
Figure 9:
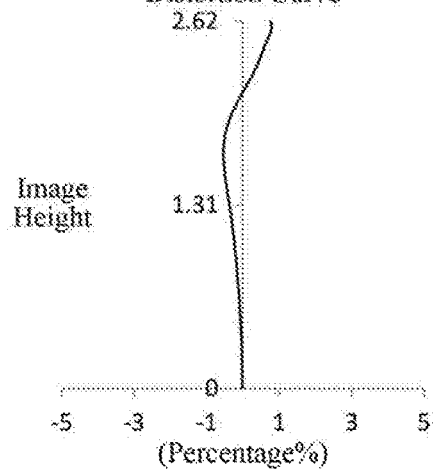
Figure 10:
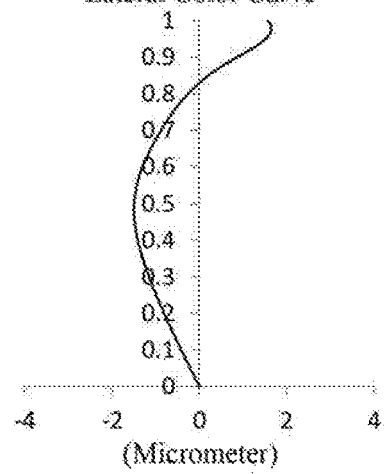

FIG. 7 illustrates a longitudinal aberration curve of the optical imaging system according to Example 2, representing deviations of focal points converged by light of different wavelengths after passing through the optical imaging system. FIG. 8 illustrates an astigmatic curve of the optical imaging system according to Example 2, representing a curvature of a tangential plane and a curvature of a sagittal plane. FIG. 9 illustrates a distortion curve of the optical imaging system according to Example 2, representing amounts of distortion corresponding to different FOVs. FIG. 10 illustrates a lateral color curve of the optical imaging system according to Example 2, representing deviations of different image heights on an image plane after light passes through the optical imaging system. It can be determined from the above description and FIGS. 7 to 10 that the optical imaging lens assembly according to Example 2 is applicable for portable electronic products, and is a telephoto optical imaging lens assembly with a long focal length and a good imaging quality.

Example 3

An optical imaging lens assembly according to Example 3 of the disclosure is described below with reference to FIGS. 11 to 15.

Figure 11:
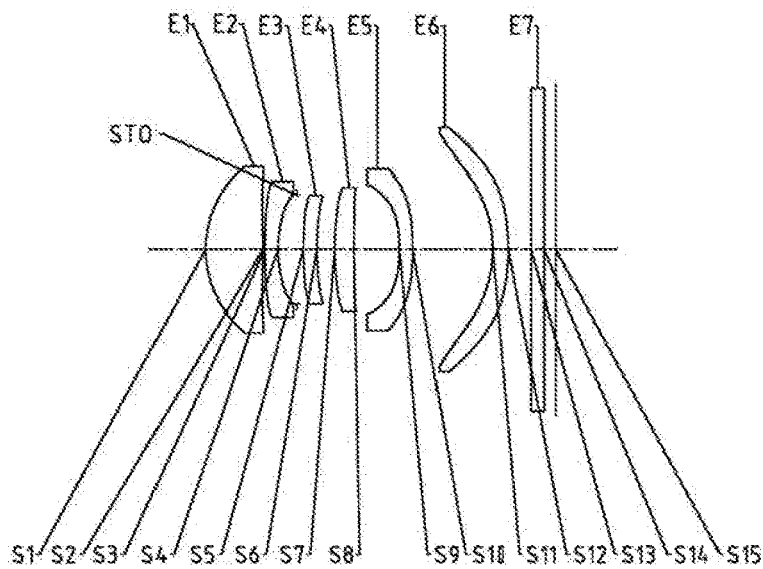
FIG. 11 shows a schematic structural diagram of an optical imaging lens assembly of Example 3.

FIG. 11 is a schematic structural diagram showing the optical imaging lens assembly of Example 3. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is convex. The second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

The following Table 7 shows effective focal lengths f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 7

| f1 (mm) | 2.73 | f (mm) | 6.02 |
|---|---|---|---|
| f2 (mm) | −4.07 | TTL (mm) | 5.50 |
| f3 (mm) | −14.44 | ImgH (mm) | 2.62 |
| f4 (mm) | 7.59 | | |
| f5 (mm) | −11.59 | | |
| f6 (mm) | −8.09 | | |

Table 8 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 8

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| S1 | Aspherical | 1.6775 | 0.9032 | 1.55 | 56.1 | −0.1876 |
| S2 | Aspherical | −10.6966 | 0.0300 | | | −120.0000 |
| S3 | Aspherical | 8.2342 | 0.2100 | 1.67 | 20.4 | 44.5838 |
| S4 | Aspherical | 2.0234 | 0.2945 | | | 1.9400 |
| STO | Spherical | Infinite | 0.1049 | | | |
| S5 | Aspherical | 6.0392 | 0.2100 | 1.55 | 56.1 | 33.1802 |
| S6 | Aspherical | 3.3781 | 0.2798 | | | −11.0721 |
| S7 | Aspherical | 3.5351 | 0.3037 | 1.65 | 23.5 | −20.5481 |
| S8 | Aspherical | 12.2697 | 0.7091 | | | 93.1712 |
| S9 | Aspherical | −2.9927 | 0.2100 | 1.55 | 56.1 | 7.3977 |
| S10 | Aspherical | −5.8166 | 1.2517 | | | 17.7885 |
| S11 | Aspherical | −2.0323 | 0.2462 | 1.55 | 56.1 | −1.1125 |
| S12 | Aspherical | −3.9253 | 0.3586 | | | −11.6798 |
| S13 | Spherical | Infinite | 0.2100 | 1.52 | 64.2 | |
| S14 | Spherical | Infinite | 0.1783 | | | |
| S15 | Spherical | Infinite | | | | |

Table 9 below shows the high-order coefficients of each of the aspherical surfaces S1-S12 that can be used for respective aspherical lens in this example. Each aspherical surface type may be defined by formula (1) given in Example 1 above.

TABLE 9

| Surface No. | A4 | A6 | A8 | A10 | A12 | A14 | A16 |
|---|---|---|---|---|---|---|---|
| S1 | 6.1793E−03 | 8.3612E−04 | −1.1054E−04 | 5.4819E−06 | −1.3306E−07 | 1.5864E−09 | −7.4564E−12 |
| S2 | 4.3946E−02 | −4.9962E−02 | 9.9606E−02 | −1.0904E−01 | 6.5700E−02 | −2.0805E−02 | 2.7351E−03 |
| S3 | −6.5244E−02 | 1.3694E−01 | −1.0304E−01 | 1.0223E−01 | −1.2113E−01 | 7.8350E−02 | −1.9810E−02 |
| S4 | −1.1973E−01 | 2.7888E−01 | −2.2453E−01 | 1.7070E−01 | 1.6046E−01 | −4.2749E−01 | 2.6023E−01 |
| S5 | −1.2391E−01 | 4.1637E−01 | −4.3973E−01 | 4.1828E−01 | −3.4499E−01 | 1.4346E−01 | −1.7204E−02 |
| S6 | −1.8418E−01 | 4.9232E−01 | −3.6984E−01 | −1.9097E−01 | 8.8618E−01 | −1.0998E+00 | 4.7140E−01 |
| S7 | −9.9483E−02 | 1.6716E−01 | −8.4770E−02 | 2.8491E−01 | −5.3774E−01 | 4.9214E−01 | −1.9144E−01 |
| S8 | −1.1272E−01 | 1.0707E−01 | −1.2696E−01 | 5.0067E−01 | −8.9995E−01 | 8.5042E−01 | −3.2151E−01 |
| S9 | −2.0679E−01 | −5.7253E−03 | 1.3291E−01 | −2.7657E−01 | 3.4222E−01 | −2.4632E−01 | 6.6136E−02 |
| S10 | −1.4384E−01 | 3.8333E−02 | 3.5941E−02 | −3.2789E−02 | 1.1353E−02 | −2.0541E−03 | 1.6561E−04 |
| S11 | −3.9744E−02 | 8.1031E−03 | 1.5542E−03 | 7.6246E−04 | −5.2976E−04 | 8.8473E−05 | −4.7460E−06 |
| S12 | −8.8291E−02 | 2.0696E−02 | −4.0525E−03 | 5.9069E−04 | −3.9538E−05 | −8.8855E−08 | 8.0398E−08 |

Figure 12:
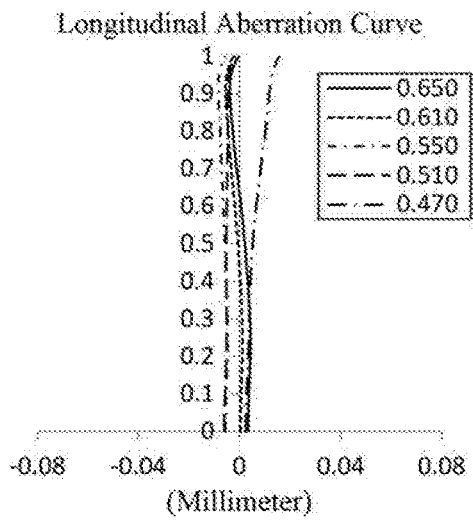
FIGS. 12 to 15 show a longitudinal aberration curve on the axis, an astigmatic curve, a distortion curve and a lateral color curve of the optical imaging lens assembly of Example 3, respectively.
Figure 13:
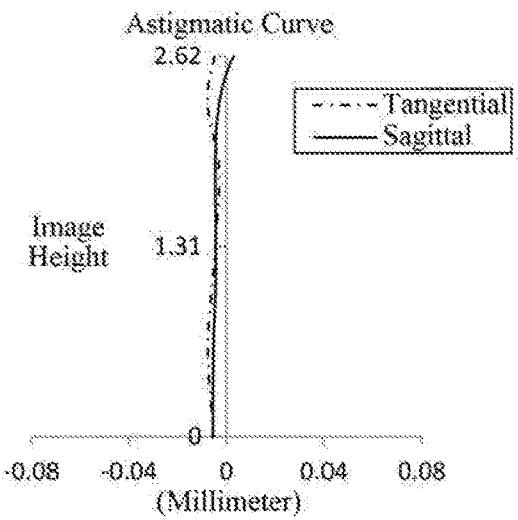
Figure 14:
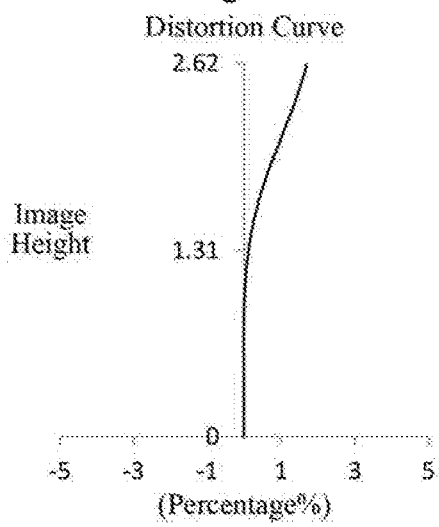
Figure 15:
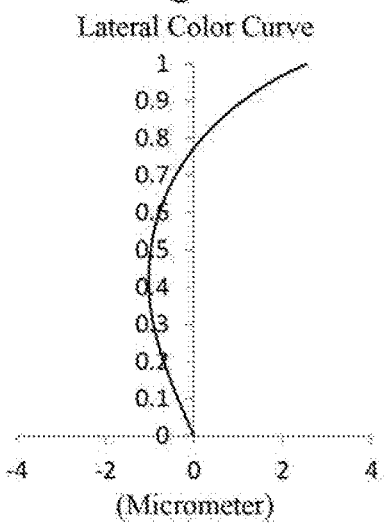

FIG. 12 illustrates a longitudinal aberration curve of the optical imaging system according to Example 3, representing deviations of focal points converged by light of different wavelengths after passing through the optical imaging system. FIG. 13 illustrates an astigmatic curve of the optical imaging system according to Example 3, representing a curvature of a tangential plane and a curvature of a sagittal plane. FIG. 14 illustrates a distortion curve of the optical imaging system according to Example 3, representing amounts of distortion corresponding to different FOVs. FIG. 15 illustrates a lateral color curve of the optical imaging system according to Example 3, representing deviations of different image heights on an image plane after light passes through the optical imaging system. It can be determined from the above description and FIGS. 12 to 15 that the optical imaging lens assembly according to Example 3 is applicable for portable electronic products, and is a telephoto optical imaging lens assembly with a long focal length and a good imaging quality.

Example 4

An optical imaging lens assembly according to Example 4 of the disclosure is described below with reference to FIGS. 16 to 20.

Figure 16:
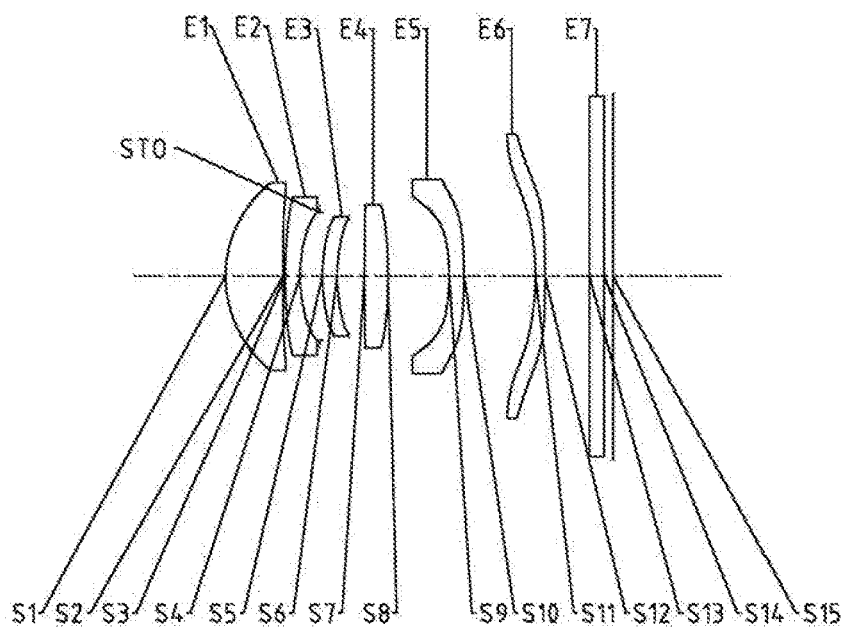
FIG. 16 shows a schematic structural diagram of an optical imaging lens assembly of Example 4.

FIG. 16 is a schematic structural diagram showing the optical imaging lens assembly of Example 4. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is concave. The second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 10 below shows effective focal lengths f1 to f6 of the first lens E1 to the sixth lens E6, the total effective focal length f of the optical imaging lens assembly, a total length TTL of the optical imaging lens assembly, and half of a diagonal length ImgH of an effective pixel region on an electronic photosensitive element.

TABLE 10

| f1 (mm) | 3.15 | f (mm) | 6.01 |
|---|---|---|---|
| f2 (mm) | −4.87 | TTL (mm) | 5.50 |
| f3 (mm) | −111.30 | ImgH (mm) | 2.62 |
| f4 (mm) | 8.89 | | |
| f5 (mm) | −10.15 | | |
| f6 (mm) | −7.75 | | |

Table 11 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 11

| | | | | Material | | |
|---|---|---|---|---|---|---|
| Surface No. | Surface Type | Curvature Radius | Thickness | Refractive Index | Abbe Number | Conic Coefficient |
| OBJ | Spherical | Infinite | Infinite | | | |
| S1 | Aspherical | 1.6684 | 0.8226 | 1.55 | 56.1 | 0.0128 |
| S2 | Aspherical | 46.6829 | 0.0300 | | | 28.2052 |
| S3 | Aspherical | 6.3639 | 0.2100 | 1.67 | 20.4 | −0.8906 |
| S4 | Aspherical | 2.1238 | 0.2843 | | | −0.4055 |
| STO | Spherical | Infinite | 0.0353 | | | |
| S5 | Aspherical | 2.4880 | 0.2100 | 1.55 | 56.1 | −0.8131 |
| S6 | Aspherical | 2.3189 | 0.3879 | | | 0.0436 |
| S7 | Aspherical | 18.9952 | 0.3351 | 1.65 | 23.5 | −120.0000 |
| S8 | Aspherical | −8.1678 | 0.8652 | | | 4.0811 |
| S9 | Aspherical | −3.0219 | 0.2100 | 1.55 | 56.1 | 3.1885 |
| S10 | Aspherical | −6.8065 | 1.0093 | | | 18.9310 |
| S11 | Aspherical | −3.4201 | 0.1352 | 1.55 | 56.1 | −6.3532 |
| S12 | Aspherical | −18.1015 | 0.6322 | | | 64.0520 |
| S13 | Spherical | Infinite | 0.2100 | 1.52 | 64.2 | |
| S14 | Spherical | Infinite | 0.1229 | | | |
| S15 | Spherical | Infinite | | | | |

Table 12 below shows the high-order coefficients of each of the aspherical surfaces S1-S12 that can be used for respective aspherical lens in this example. Each aspherical surface type may be defined by formula (1) given in Example 1 above.

TABLE 12

| Surface No. | A4 | A6 | A8 | A10 | A12 | A14 | A16 |
|---|---|---|---|---|---|---|---|
| S1 | −4.2771E−03 | 6.7005E−04 | −1.7972E−03 | −4.9676E−04 | 1.0327E−03 | −5.0537E−04 | 1.0112E−04 |
| S2 | −4.4532E−02 | 8.8372E−02 | −5.3183E−02 | 2.6292E−02 | −2.4014E−02 | 1.4341E−02 | −3.0225E−03 |
| S3 | −6.4023E−02 | 5.2474E−02 | 9.8176E−02 | −1.2527E−01 | 2.8740E−02 | 1.3952E−02 | −5.1128E−03 |
| S4 | −1.0893E−02 | −2.7712E−02 | 2.3950E−01 | −1.6416E−01 | 8.2946E−02 | −1.0746E−01 | 4.8676E−02 |
| S5 | −4.7950E−02 | −4.7074E−02 | 3.6933E−01 | −1.6422E−01 | 2.7706E−02 | −7.4303E−02 | 5.0518E−02 |
| S6 | −7.1681E−02 | −8.1709E−02 | 5.5915E−01 | −7.4262E−01 | 9.4013E−01 | −6.7673E−01 | 2.0485E−01 |
| S7 | −2.2289E−02 | −3.3219E−02 | −3.6214E−02 | 2.6429E−01 | −3.5151E−01 | 2.4553E−01 | −7.5746E−02 |
| S8 | −1.5406E−02 | −4.6694E−02 | 9.4698E−03 | 6.2252E−02 | −7.5044E−02 | 4.4565E−02 | −1.1055E−02 |
| S9 | −8.6695E−03 | −2.3749E−01 | 7.8421E−02 | 1.8380E−01 | −3.1919E−01 | 2.0201E−01 | −4.4190E−02 |
| S10 | 5.9361E−02 | −2.5641E−01 | 2.6237E−01 | −1.6157E−01 | 6.7066E−02 | −1.5827E−02 | 1.5377E−03 |
| S11 | 2.6913E−02 | −6.1903E−02 | 2.6288E−02 | 5.5704E−03 | −2.4874E−03 | 5.5136E−04 | −3.9537E−05 |
| S12 | −1.5519E−02 | −3.2981E−02 | 1.5624E−02 | −1.5069E−03 | −2.2411E−04 | 4.1485E−05 | −1.5937E−06 |

Figure 17:
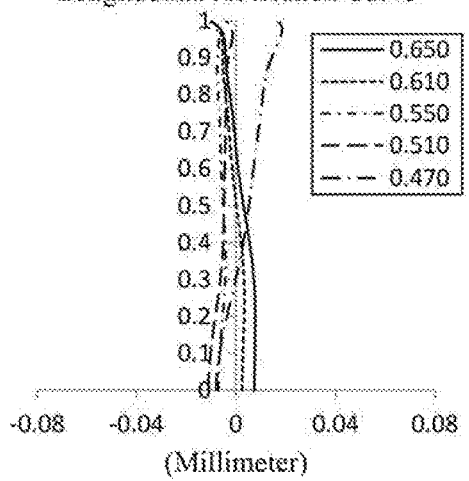
FIGS. 17 to 20 show a longitudinal aberration curve, an astigmatic curve, a distortion curve and a lateral color curve of the optical imaging lens assembly of Example 4, respectively.
Figure 18:
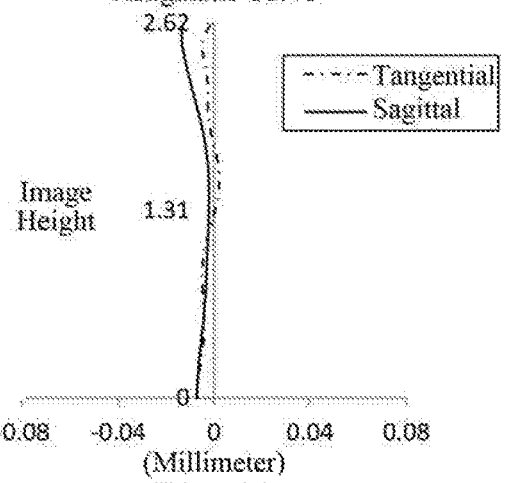
Figure 19:
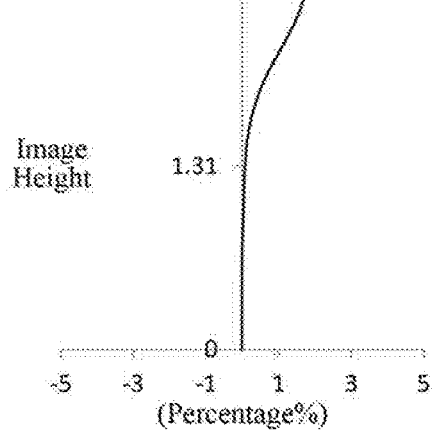
Figure 20:
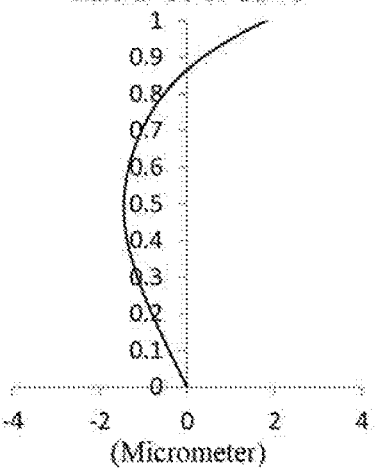

FIG. 17 illustrates a longitudinal aberration curve of the optical imaging system according to Example 4, representing deviations of focal points converged by light of different wavelengths after passing through the optical imaging system. FIG. 18 illustrates an astigmatic curve of the optical imaging system according to Example 4, representing a curvature of a tangential plane and a curvature of a sagittal plane. FIG. 19 illustrates a distortion curve of the optical imaging system according to Example 4, representing amounts of distortion corresponding to different FOVs. FIG. 20 illustrates a lateral color curve of the optical imaging system according to Example 4, representing deviations of different image heights on an image plane after light passes through the optical imaging system. It can be determined from the above description and FIGS. 17 to 20 that the optical imaging lens assembly according to Example 4 is applicable for portable electronic products, and is a telephoto optical imaging lens assembly with a long focal length and a good imaging quality.

Example 5

An optical imaging lens assembly according to Example 5 of the disclosure is described below with reference to FIGS. 21 to 25.

Figure 21:
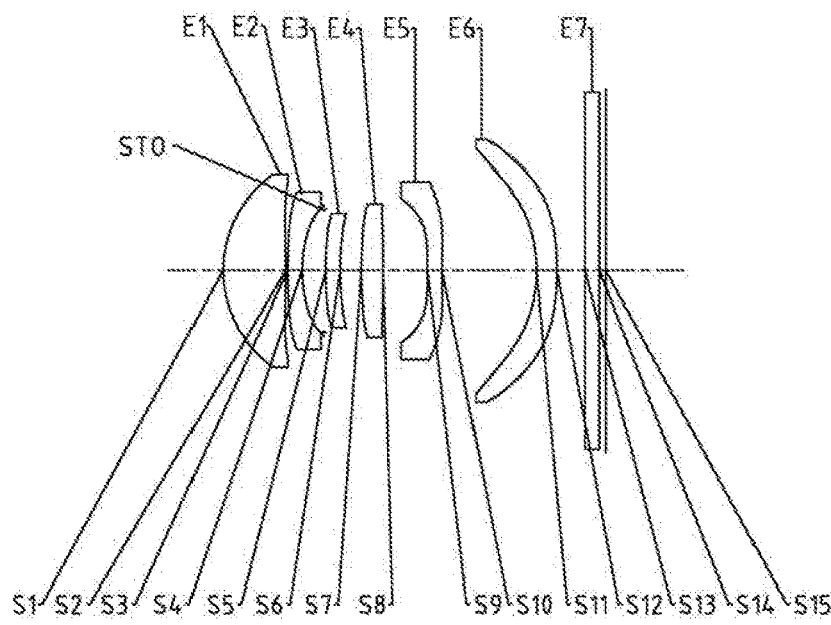
FIG. 21 shows a schematic structural diagram of an optical imaging lens assembly of Example 5.

FIG. 21 is a schematic structural diagram showing the optical imaging lens assembly of Example 5. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is convex. The second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a negative refractive power. An object side surface S9 of the fifth lens E5 may be concave, and an image side surface S10 of the fifth lens E5 may be concave. The sixth lens E6 may have a negative refractive power. An object side surface S11 of the sixth lens E6 may be concave, and an image side surface S12 of the sixth lens E6 may be convex.

Table 13 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 13

| f1 (mm) | 2.73 | f (mm) | 6.01 |
|---|---|---|---|
| f2 (mm) | −3.95 | TTL (mm) | 5.50 |
| f3 (mm) | −21.55 | ImgH (mm) | 2.62 |
| f4 (mm) | 7.99 | | |
| f5 (mm) | −9.90 | | |
| f6 (mm) | −7.72 | | |

Table 14 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 14

| Surface No. | Surface Type | Curvature Radius | Thickness | Material Refractive Index | Material Abbe Number | Conic Coefficient |
|---|---|---|---|---|---|---|
| OBJ | Spherical | Infinite | Infinite | | | |
| S1 | Aspherical | 1.6780 | 0.8995 | 1.55 | 56.1 | −0.2201 |
| S2 | Aspherical | −10.6810 | 0.0300 | | | −120.0000 |
| S3 | Aspherical | 8.3870 | 0.2100 | 1.67 | 20.4 | 46.1744 |
| S4 | Aspherical | 1.9872 | 0.3089 | | | 1.9730 |
| STO | Spherical | Infinite | 0.0300 | | | |
| S5 | Aspherical | 5.9187 | 0.2100 | 1.55 | 56.1 | 33.1323 |
| S6 | Aspherical | 3.8890 | 0.3048 | | | −9.8600 |
| S7 | Aspherical | 5.1204 | 0.3158 | 1.65 | 23.5 | 3.0764 |
| S8 | Aspherical | 754.6976 | 0.6296 | | | 99.0000 |
| S9 | Aspherical | −21.9559 | 0.2100 | 1.55 | 56.1 | 99.0000 |
| S10 | Aspherical | 7.1971 | 1.3541 | | | −109.1045 |
| S11 | Aspherical | −2.1774 | 0.2933 | 1.55 | 56.1 | −0.6709 |
| S12 | Aspherical | −4.7195 | 0.4025 | | | 4.1528 |
| S13 | Spherical | Infinite | 0.2100 | 1.52 | 64.2 | |
| S14 | Spherical | Infinite | 0.0914 | | | |
| S15 | Spherical | Infinite | | | | |

Table 15 below shows the high-order coefficients of each of the aspherical surfaces S1-S12 that can be used for respective aspherical lens in this example. Each aspherical surface type may be defined by formula (1) given in Example 1 above.

TABLE 15

| Surface No. | A4 | A6 | A8 | A10 | A12 | A14 | A16 |
|---|---|---|---|---|---|---|---|
| S1 | 6.4390E−03 | 1.3886E−03 | −1.9669E−04 | 1.0883E−05 | −3.0157E−07 | 4.0953E−09 | −2.1596E−11 |
| S2 | 6.5711E−02 | −9.9549E−02 | 1.6761E−01 | −1.6695E−01 | 9.5902E−02 | −2.9503E−02 | 3.7718E−03 |
| S3 | −3.9953E−02 | 8.5056E−02 | −5.7295E−02 | 1.0096E−01 | −1.5380E−01 | 1.0455E−01 | −2.6584E−02 |
| S4 | −1.1482E−01 | 2.6690E−01 | −2.0747E−01 | 9.8116E−02 | 3.9007E−01 | −7.3055E−01 | 4.0972E−01 |
| S5 | −1.0205E−01 | 3.6117E−01 | −3.8916E−01 | 4.4257E−01 | −4.6428E−01 | 2.5275E−01 | −4.9087E−02 |
| S6 | −1.4048E−01 | 3.9116E−01 | −2.0966E−01 | −4.7720E−01 | 1.2951E+00 | −1.4656E+00 | 6.1785E−01 |
| S7 | −1.3702E−01 | 2.1885E−01 | −1.9526E−01 | 3.9996E−01 | −6.0772E−01 | 5.0193E−01 | −1.7769E−01 |
| S8 | −1.1827E−01 | 1.2513E−01 | −7.4847E−02 | 1.6576E−01 | −2.5847E−01 | 2.4848E−01 | −9.0080E−02 |
| S9 | −3.3160E−01 | 7.3040E−02 | 6.1179E−02 | −2.4415E−01 | 3.2351E−01 | −2.5477E−01 | 7.6085E−02 |
| S10 | −2.0795E−01 | 9.1843E−02 | 1.0777E−02 | −4.2071E−02 | 2.5504E−02 | −6.5558E−03 | 6.1494E−04 |
| S11 | −4.6246E−02 | 1.1017E−02 | −5.6883E−04 | 9.5213E−04 | −3.7553E−04 | 5.3741E−05 | −2.7869E−06 |
| S12 | −7.2364E−02 | 1.6992E−02 | −2.6153E−03 | 2.1871E−04 | −9.4942E−06 | 2.0300E−07 | −1.6918E−09 |

Figure 22:
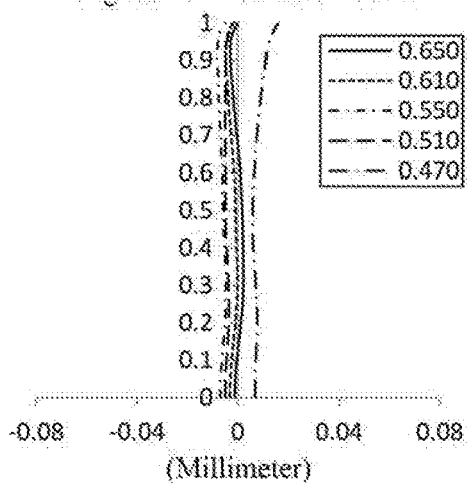
FIGS. 22 to 25 show a longitudinal aberration curve, an astigmatic curve, a distortion curve and a lateral color curve of the optical imaging lens assembly of Example 5, respectively.
Figure 23:
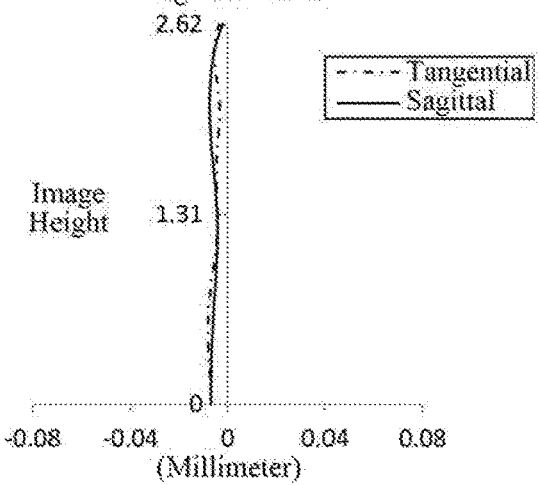
Figure 24:
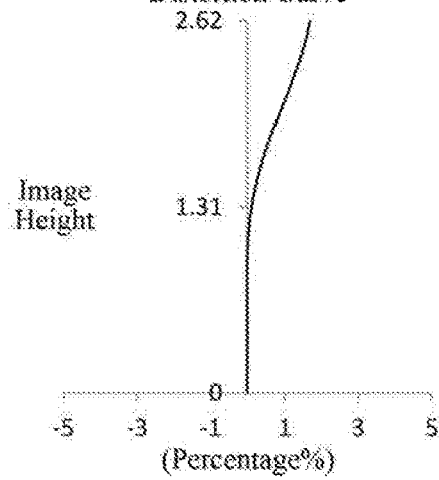
Figure 25:
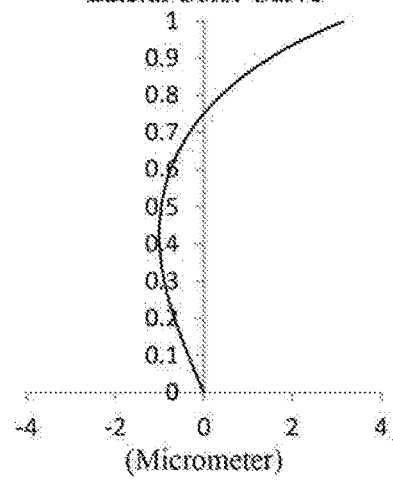

FIG. 22 illustrates a longitudinal aberration curve of the optical imaging system according to Example 5, representing deviations of focal points converged by light of different wavelengths after passing through the optical imaging system. FIG. 23 illustrates an astigmatic curve of the optical imaging system according to Example 5, representing a curvature of a tangential plane and a curvature of a sagittal plane. FIG. 24 illustrates a distortion curve of the optical imaging system according to Example 5, representing amounts of distortion corresponding to different FOVs. FIG. 25 illustrates a lateral color curve of the optical imaging system according to Example 5, representing deviations of different image heights on an image plane after light passes through the optical imaging system. It can be determined from the above description and FIGS. 22 to 25 that the optical imaging lens assembly according to Example 5 is applicable for portable electronic products, and is a telephoto optical imaging lens assembly with a long focal length and a good imaging quality.

Example 6

An optical imaging lens assembly according to Example 6 of the disclosure is described below with reference to FIGS. 26 to 30.

Figure 26:
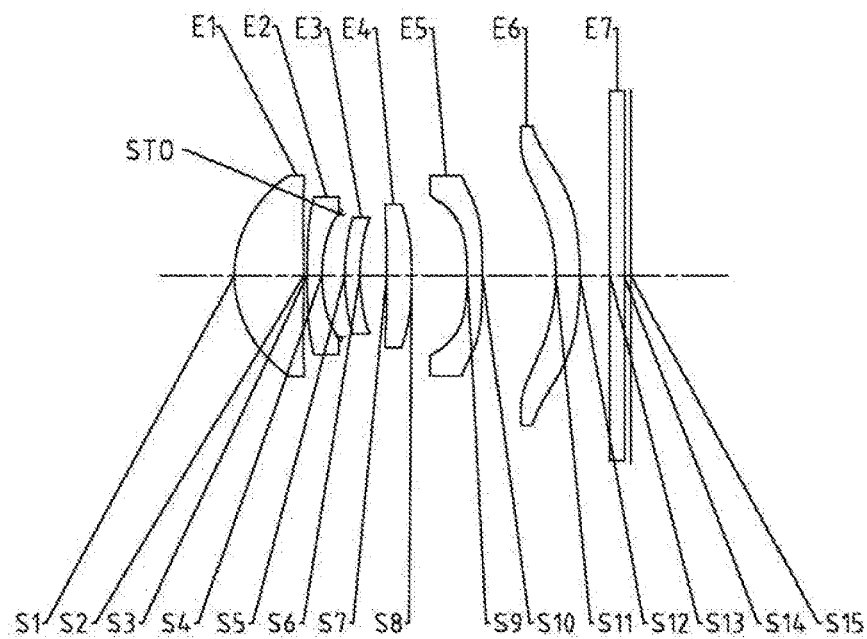
FIG. 26 shows a schematic structural diagram of an optical imaging lens assembly of Example 6.

FIG. 26 is a schematic structural diagram showing the optical imaging lens assembly of Example 6. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is convex. The second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be concave, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 16 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 16

| f1 (mm) | 2.86 | f (mm) | 6.02 |
|---|---|---|---|
| f2 (mm) | −4.34 | TTL (mm) | 5.50 |
| f3 (mm) | −24.65 | ImgH (mm) | 2.62 |
| f4 (mm) | 8.62 | | |
| f5 (mm) | −9.33 | | |
| f6 (mm) | −8.66 | | |

Table 17 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 17

| Surface No. | Surface Type | Curvature Radius | Thickness | Material Refractive Index | Material Abbe Number | Conic Coefficient |
|---|---|---|---|---|---|---|
| OBJ | Spherical | Infinite | Infinite | | | |
| S1 | Aspherical | 1.6339 | 0.9685 | 1.55 | 56.1 | −0.0223 |
| S2 | Aspherical | −27.1670 | 0.0423 | | | −120.0000 |
| S3 | Aspherical | 7.0546 | 0.2100 | 1.67 | 20.4 | 2.3534 |
| S4 | Aspherical | 2.0274 | 0.2704 | | | 0.6819 |
| STO | Spherical | Infinite | 0.0462 | | | 0.0000 |
| S5 | Aspherical | 2.8511 | 0.2100 | 1.55 | 56.1 | 3.1436 |
| S6 | Aspherical | 2.2916 | 0.3712 | | | −1.4105 |
| S7 | Aspherical | −189.5755 | 0.3516 | 1.65 | 23.5 | 99.0000 |
| S8 | Aspherical | −5.4105 | 0.7639 | | | 14.7080 |
| S9 | Aspherical | −3.8429 | 0.2100 | 1.55 | 56.1 | 8.2733 |
| S10 | Aspherical | −15.9116 | 1.0144 | | | 46.7927 |
| S11 | Aspherical | −2.3778 | 0.3332 | 1.55 | 56.1 | −1.8300 |
| S12 | Aspherical | −5.0157 | 0.4172 | | | −53.2715 |
| S13 | Spherical | Infinite | 0.2100 | 1.52 | 64.2 | |
| S14 | Spherical | Infinite | 0.0810 | | | |
| S15 | Spherical | Infinite | | | | |

Table 18 below shows the high-order coefficients of each of the aspherical surfaces S1-S12 that can be used for respective aspherical lens in this example. Each aspherical surface type may be defined by formula (1) given in Example 1 above.

TABLE 18

| Surface No. | A4 | A6 | A8 | A10 | A12 | A14 | A16 |
|---|---|---|---|---|---|---|---|
| S1 | −1.1003E−03 | −2.2768E−03 | 5.0920E−03 | −8.8843E−03 | 7.4234E−03 | −3.5514E−03 | 6.8455E−04 |
| S2 | −3.5398E−02 | 1.1453E−01 | −1.3604E−01 | 9.9044E−02 | −4.4816E−02 | 1.1893E−02 | −1.4456E−03 |
| S3 | −8.1394E−02 | 1.3448E−01 | −1.6993E−02 | −1.1723E−01 | 1.3995E−01 | −7.0811E−02 | 1.2952E−02 |
| S4 | −4.2393E−02 | 8.3937E−02 | −6.4221E−02 | 7.2807E−01 | −1.7770E+00 | 2.0402E+00 | −9.3932E−01 |
| S5 | −7.5586E−02 | −1.5445E−01 | 1.1027E+00 | −2.8712E+00 | 5.0049E+00 | −4.6807E+00 | 1.6978E+00 |
| S6 | −6.7543E−02 | −1.4522E−01 | 1.0098E+00 | −2.5128E+00 | 4.2189E+00 | −3.6276E+00 | 1.1445E+00 |
| S7 | −3.4234E−02 | −4.1064E−02 | −2.1391E−02 | 2.0720E−01 | −3.2013E−01 | 3.5377E−01 | −1.4990E−01 |
| S8 | −2.0165E−02 | −4.9064E−02 | 2.2026E−02 | −3.8391E−02 | 1.1786E−01 | −1.2843E−01 | 6.2373E−02 |
| S9 | −6.4545E−02 | −2.4480E−01 | 2.7074E−01 | −1.6076E−01 | −7.9120E−02 | 1.4239E−01 | −4.2864E−02 |
| S10 | −1.2535E−02 | −2.2312E−01 | 3.2978E−01 | −3.0281E−01 | 1.7640E−01 | −5.4419E−02 | 6.6305E−03 |
| S11 | 4.0365E−02 | −5.7859E−02 | 2.8331E−02 | −3.4661E−03 | −8.4274E−04 | 2.7589E−04 | −2.2237E−05 |
| S12 | −5.7925E−02 | 1.2632E−02 | −1.6923E−02 | 1.2317E−02 | −3.9440E−03 | 6.1567E−04 | −3.8591E−05 |

Figure 27:
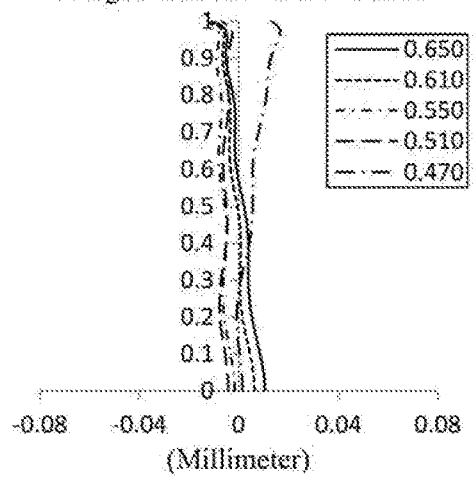
FIGS. 27 to 30 show a longitudinal aberration curve, an astigmatic curve, a distortion curve and a lateral color curve of the optical imaging lens assembly of Example 6, respectively.
Figure 28:
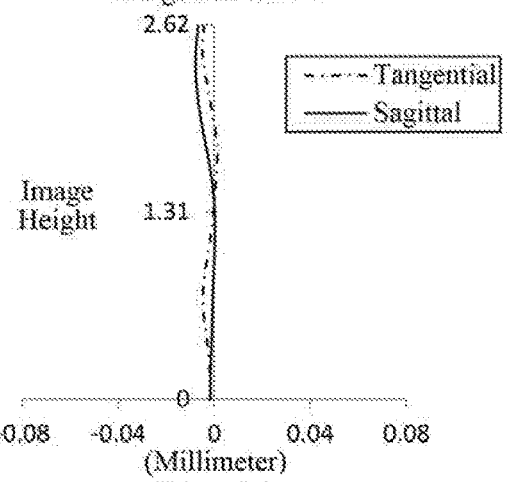
Figure 29:
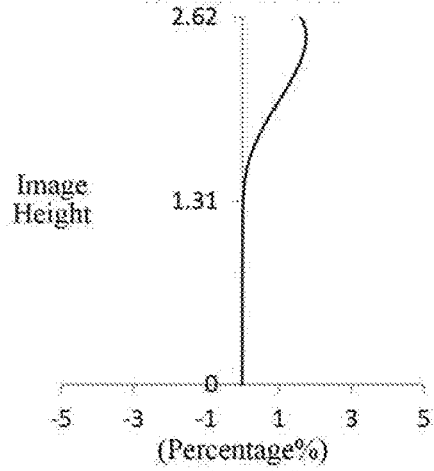
Figure 30:
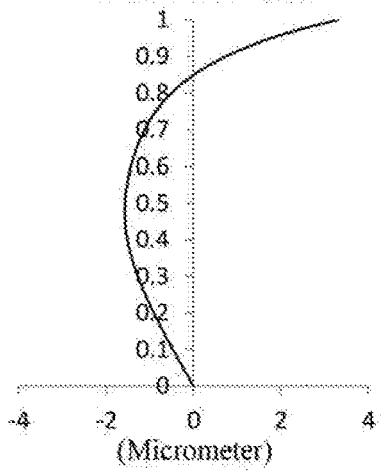

FIG. 27 illustrates a longitudinal aberration curve of the optical imaging system according to Example 6, representing deviations of focal points converged by light of different wavelengths after passing through the optical imaging system. FIG. 28 illustrates an astigmatic curve of the optical imaging system according to Example 6, representing a curvature of a tangential plane and a curvature of a sagittal plane. FIG. 29 illustrates a distortion curve of the optical imaging system according to Example 6, representing amounts of distortion corresponding to different FOVs. FIG. 30 illustrates a lateral color curve of the optical imaging system according to Example 6, representing deviations of different image heights on an image plane after light passes through the optical imaging system. It can be determined from the above description and FIGS. 27 to 30 that the optical imaging lens assembly according to Example 6 is applicable for portable electronic products, and is a telephoto optical imaging lens assembly with a long focal length and a good imaging quality.

Example 7

An optical imaging lens assembly according to Example 7 of the disclosure is described below with reference to FIGS. 31 to 35.

Figure 31:
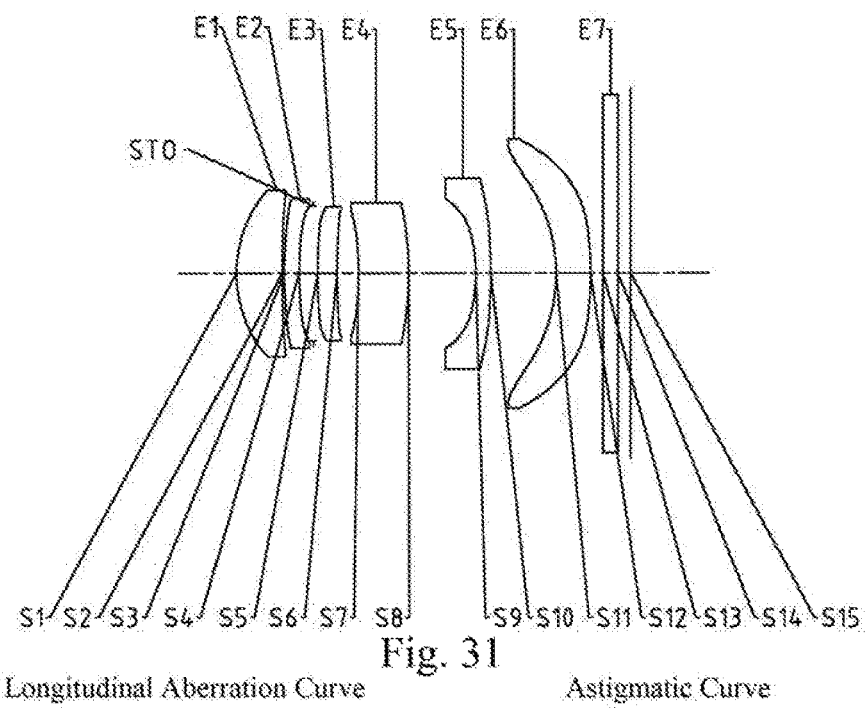
FIG. 31 shows a schematic structural diagram of an optical imaging lens assembly of Example 7.

FIG. 31 is a schematic structural diagram showing the optical imaging lens assembly of Example 7. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is concave. The second lens E2 may have a positive refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be concave, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 19 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 19

| f1 (mm) | 3.93 | f (mm) | 5.99 |
|---|---|---|---|
| f2 (mm) | 158627.84 | TTL (mm) | 5.52 |
| f3 (mm) | −31.55 | ImgH (mm) | 2.62 |
| f4 (mm) | 33.14 | | |
| f5 (mm) | −6.81 | | |
| f6 (mm) | −6.34 | | |

Table 20 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 20

| Surface No. | Surface Type | Curvature Radius | Thickness | Material Refractive Index | Material Abbe Number | Conic Coefficient |
|---|---|---|---|---|---|---|
| OBJ | Spherical | Infinite | Infinite | | | |
| S1 | Aspherical | 1.8565 | 0.6420 | 1.55 | 56.1 | 0.2278 |
| S2 | Aspherical | 12.0101 | 0.0300 | | | 48.7879 |
| S3 | Aspherical | 5.4691 | 0.2100 | 1.67 | 20.4 | 5.1133 |
| S4 | Aspherical | 5.3853 | 0.2014 | | | 7.1211 |
| STO | Spherical | Infinite | 0.0603 | | | |
| S5 | Aspherical | 9.5997 | 0.2684 | 1.55 | 56.1 | 93.6492 |
| S6 | Aspherical | 6.1044 | 0.3018 | | | −93.6044 |
| S7 | Aspherical | −6.0606 | 0.7058 | 1.65 | 23.5 | 7.2265 |
| S8 | Aspherical | −4.9382 | 0.9357 | | | −5.6887 |
| S9 | Aspherical | −2.4021 | 0.2100 | 1.55 | 56.1 | 3.4459 |
| S10 | Aspherical | −6.9951 | 0.9098 | | | −26.4291 |
| S11 | Aspherical | −2.2283 | 0.4831 | 1.55 | 56.1 | −0.4123 |
| S12 | Aspherical | −6.7231 | 0.1757 | | | 0.4129 |
| S13 | Spherical | Infinite | 0.2100 | 1.52 | 64.2 | |
| S14 | Spherical | Infinite | 0.1759 | | | |
| S15 | Spherical | Infinite | | | | |

Table 21 below shows the high-order coefficients of each of the aspherical surfaces S1-S12 that can be used for respective aspherical lens in this example. Each aspherical surface type may be defined by formula (1) given in Example 1 above.

TABLE 21

| Surface No. | A4 | A6 | A8 | A10 | A12 | A14 | A16 |
|---|---|---|---|---|---|---|---|
| S1 | 1.8909E−03 | −2.8282E−02 | 1.0476E−01 | −1.8483E−01 | 1.7713E−01 | −8.9531E−02 | 1.8692E−02 |
| S2 | −9.8082E−02 | 5.1415E−01 | −1.3984E+00 | 2.0917E+00 | −1.7638E+00 | 7.8582E−01 | −1.4238E−01 |
| S3 | −1.2271E−01 | 5.6930E−01 | −1.7477E+00 | 3.0032E+00 | −2.8160E+00 | 1.3714E+00 | −2.7322E−01 |
| S4 | −2.9081E−02 | 1.7538E−01 | −7.2322E−01 | 1.9002E+00 | −2.3812E+00 | 1.5699E+00 | −4.5130E−01 |
| S5 | −4.2861E−02 | 1.0303E−01 | −4.3286E−01 | 1.8696E+00 | −3.2574E+00 | 2.7821E+00 | −9.4400E−01 |
| S6 | −5.4175E−02 | −4.4204E−02 | 1.2262E−01 | 3.2198E−01 | −9.2440E−01 | 9.3640E−01 | −2.7434E−01 |
| S7 | −7.1240E−02 | −2.6216E−02 | 1.1023E−01 | −1.1853E−01 | 5.0719E−02 | 5.6533E−02 | −4.0307E−02 |
| S8 | −1.7600E−02 | 1.2424E−02 | −3.1222E−02 | 5.7433E−02 | −4.0277E−02 | 6.0797E−03 | 1.9906E−03 |
| S9 | 3.4609E−02 | −1.8041E−01 | 1.4023E−01 | −5.3495E−02 | −3.8988E−02 | 5.5693E−02 | −2.2848E−02 |
| S10 | 5.8053E−02 | −1.6735E−01 | 1.6432E−01 | −1.0233E−01 | 4.3565E−02 | −1.0226E−02 | 8.9608E−04 |
| S11 | 2.7352E−02 | −5.2625E−02 | 5.0675E−02 | −3.2122E−02 | 1.2698E−02 | −2.5636E−03 | 2.0125E−04 |
| S12 | −4.4138E−02 | −2.9895E−02 | 3.1213E−02 | −1.7025E−02 | 5.4062E−03 | −9.5459E−04 | 7.1443E−05 |

Figure 32:
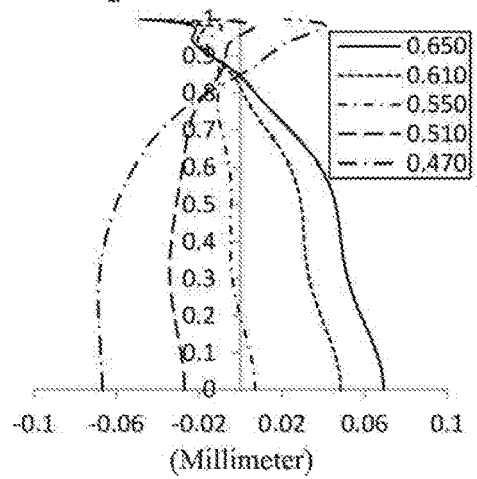
FIGS. 32 to 35 show a longitudinal aberration curve, an astigmatic curve, a distortion curve and a lateral color curve of the optical imaging lens assembly of Example 7, respectively.
Figure 33:
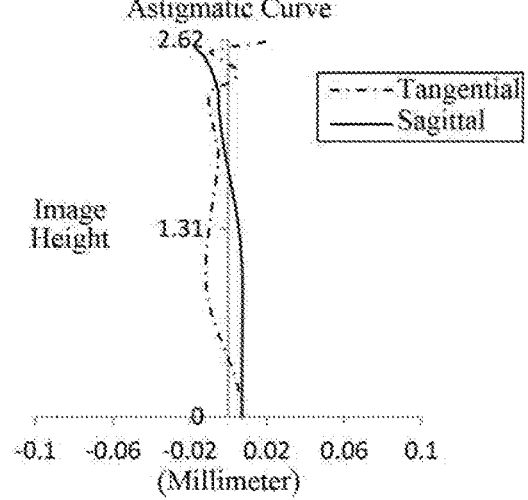
Figure 34:
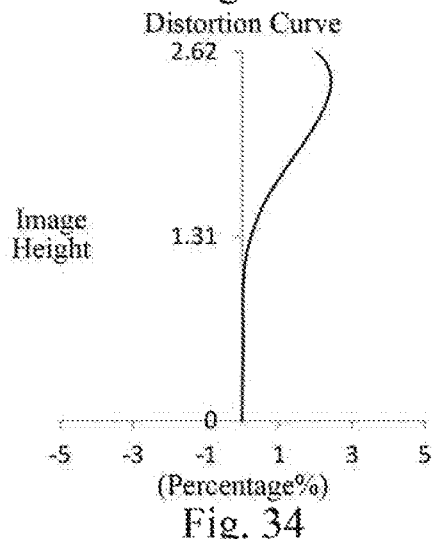
Figure 35:
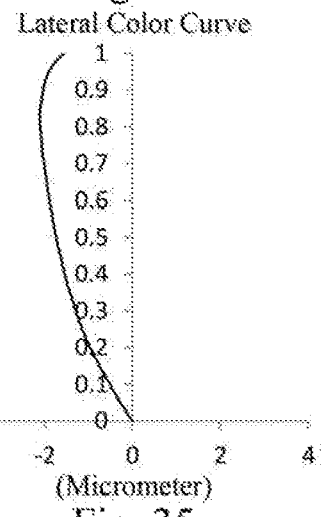

FIG. 32 illustrates a longitudinal aberration curve of the optical imaging system according to Example 7, representing deviations of focal points converged by light of different wavelengths after passing through the optical imaging system. FIG. 33 illustrates an astigmatic curve of the optical imaging system according to Example 7, representing a curvature of a tangential plane and a curvature of a sagittal plane. FIG. 34 illustrates a distortion curve of the optical imaging system according to Example 7, representing amounts of distortion corresponding to different FOVs. FIG. 35 illustrates a lateral color curve of the optical imaging system according to Example 7, representing deviations of different image heights on an image plane after light passes through the optical imaging system. It can be determined from the above description and FIGS. 32 to 35 that the optical imaging lens assembly according to Example 7 is applicable for portable electronic products, and is a telephoto optical imaging lens assembly with a long focal length and a good imaging quality.

Example 8

An optical imaging lens assembly according to Example 8 of the disclosure is described below with reference to FIGS. 36 to 40.

Figure 36:
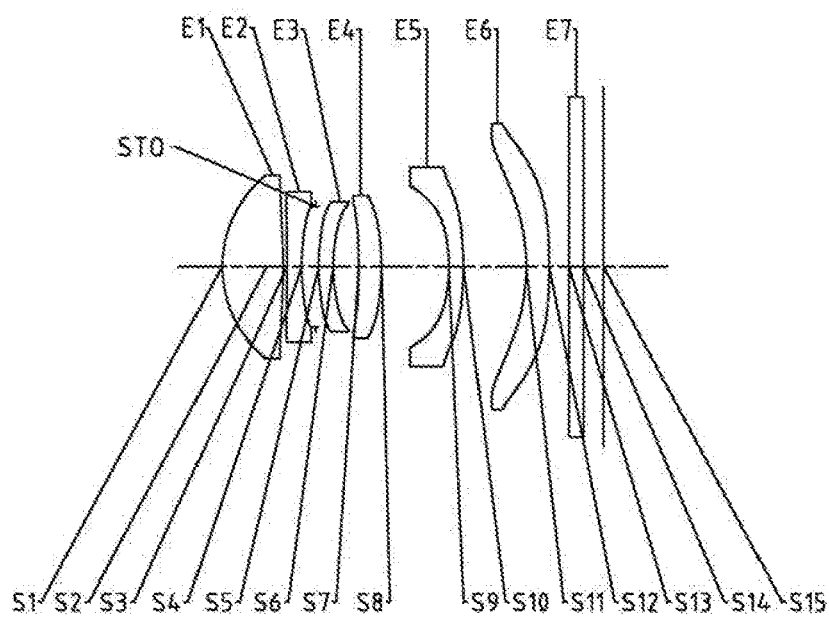
FIG. 36 shows a schematic structural diagram of an optical imaging lens assembly of Example 8.

FIG. 36 is a schematic structural diagram showing the optical imaging lens assembly of Example 8. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is convex. The second lens E2 may have a negative refractive power. An object side surface S3 of the second lens E2 may be concave, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be concave, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 22 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 22

| f1 (mm) | 2.78 | f (mm) | 5.99 |
|---|---|---|---|
| f2 (mm) | −4.80 | TTL (mm) | 5.51 |
| f3 (mm) | −20.59 | ImgH (mm) | 2.62 |
| f4 (mm) | 9.93 | | |
| f5 (mm) | −9.85 | | |
| f6 (mm) | −7.47 | | |

Table 23 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 23

| Surface No. | Surface Type | Curvature Radius | Thickness | Material Refractive Index | Material Abbe Number | Conic Coefficient |
|---|---|---|---|---|---|---|
| OBJ | Spherical | Infinite | Infinite | | | |
| S1 | Aspherical | 1.7101 | 0.8795 | 1.55 | 56.1 | 0.0853 |
| S2 | Aspherical | −11.1846 | 0.0613 | | | −100.9673 |
| S3 | Aspherical | −72.6932 | 0.2100 | 1.67 | 20.4 | −93.1500 |
| S4 | Aspherical | 3.3585 | 0.1979 | | | 0.1245 |
| STO | Spherical | Infinite | 0.0482 | | | |
| S5 | Aspherical | 3.0193 | 0.2100 | 1.55 | 56.1 | −0.5707 |
| S6 | Aspherical | 2.3218 | 0.3716 | | | 0.3145 |
| S7 | Aspherical | −8.1780 | 0.3312 | 1.65 | 23.5 | −26.3178 |
| S8 | Aspherical | −3.6506 | 0.9659 | | | 2.6764 |
| S9 | Aspherical | −2.4857 | 0.2103 | 1.55 | 56.1 | 3.0920 |
| S10 | Aspherical | −4.7599 | 0.9037 | | | 2.5408 |
| S11 | Aspherical | −2.8586 | 0.3337 | 1.55 | 56.1 | −0.3286 |
| S12 | Aspherical | −9.9392 | 0.2882 | | | 3.8072 |
| S13 | Spherical | Infinite | 0.2100 | 1.52 | 64.2 | |
| S14 | Spherical | Infinite | 0.2884 | | | |
| S15 | Spherical | Infinite | | | | |

Table 24 below shows the high-order coefficients of each of the aspherical surfaces S1-S12 that can be used for respective aspherical lens in this example. Each aspherical surface type may be defined by formula (1) given in Example 1 above.

TABLE 24

| Surface No. | A4 | A6 | A8 | A10 | A12 | A14 | A16 |
|---|---|---|---|---|---|---|---|
| S1 | −4.2841E−03 | 2.7589E−03 | −7.6036E−03 | 1.2270E−02 | −1.0694E−02 | 4.2381E−03 | −6.9338E−04 |
| S2 | −3.3007E−02 | 1.1977E−01 | −2.0877E−01 | 2.1753E−01 | −1.3020E−01 | 4.1226E−02 | −5.3683E−03 |
| S3 | −5.5033E−02 | 1.3039E−01 | −2.3860E−01 | 3.2599E−01 | −2.3204E−01 | 7.5475E−02 | −8.3331E−03 |
| S4 | −1.9620E−01 | −1.9359E−02 | 2.5681E−02 | 2.2384E−01 | −2.8262E−01 | 2.1826E−01 | −1.0568E−01 |
| S5 | −1.8900E−02 | −2.0146E−01 | 4.3280E−01 | −1.8454E−01 | 3.0166E−01 | −4.2400E−01 | 1.5049E−01 |
| S6 | −1.9248E−02 | −1.5814E−01 | 2.1738E−01 | 5.0115E−01 | −1.1644E+00 | 1.2770E+00 | −5.9426E−01 |
| S7 | −1.0849E−02 | −3.3248E−02 | −1.6642E−01 | 4.6097E−01 | −5.4070E−01 | 3.5146E−01 | −8.7642E−02 |
| S8 | 5.4697E−03 | −4.7406E−02 | 3.9359E−03 | −5.0662E−02 | 1.5938E−01 | −1.6899E−01 | 6.2711E−02 |
| S9 | 3.7972E−02 | −1.9682E−01 | 1.4338E−01 | −9.6555E−02 | 6.4659E−02 | −4.4173E−02 | 2.0330E−02 |
| S10 | 6.6500E−02 | −1.7803E−01 | 1.4917E−01 | −8.0808E−02 | 2.9231E−02 | −4.1771E−03 | −1.3647E−04 |
| S11 | 1.3586E−03 | −6.0200E−03 | 9.2154E−03 | −4.7780E−03 | 1.4780E−03 | −2.3766E−04 | 1.5350E−05 |
| S12 | −5.6417E−02 | 1.1684E−02 | −1.2552E−03 | −1.3165E−04 | 1.3276E−04 | −4.4857E−05 | 5.7347E−06 |

Figure 37:
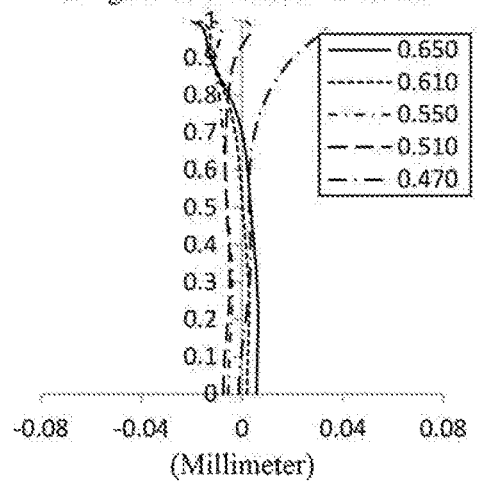
FIGS. 37 to 40 show a longitudinal aberration curve, an astigmatic curve, a distortion curve and a lateral color curve of the optical imaging lens assembly of Example 8, respectively.
Figure 38:
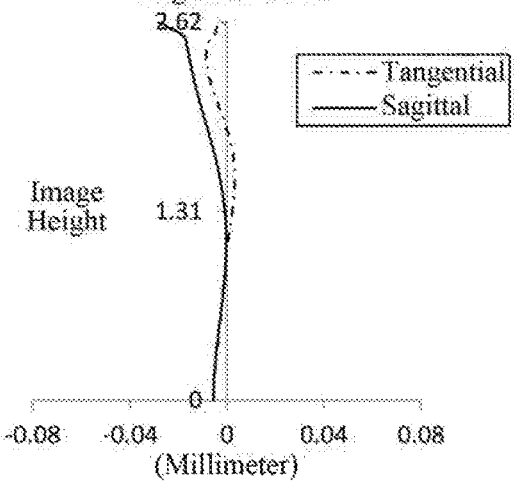
Figure 39:
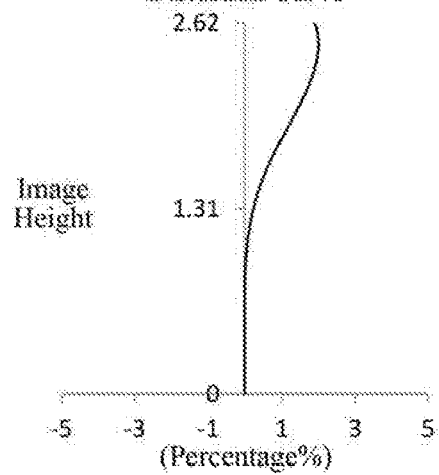
Figure 40:
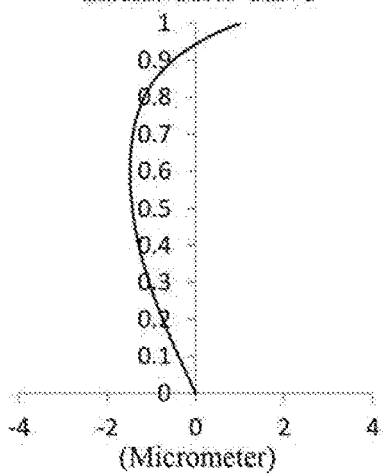

FIG. 37 illustrates a longitudinal aberration curve of the optical imaging system according to Example 8, representing deviations of focal points converged by light of different wavelengths after passing through the optical imaging system. FIG. 38 illustrates an astigmatic curve of the optical imaging system according to Example 8, representing a curvature of a tangential plane and a curvature of a sagittal plane. FIG. 39 illustrates a distortion curve of the optical imaging system according to Example 8, representing amounts of distortion corresponding to different FOVs. FIG. 40 illustrates a lateral color curve of the optical imaging system according to Example 8, representing deviations of different image heights on an image plane after light passes through the optical imaging system. It can be determined from the above description and FIGS. 37 to 40 that the optical imaging lens assembly according to Example 8 is applicable for portable electronic products, and is a telephoto optical imaging lens assembly with a long focal length and a good imaging quality.

Example 9

An optical imaging lens assembly according to Example 9 of the disclosure is described below with reference to FIGS. 41 to 45.

Figure 41:
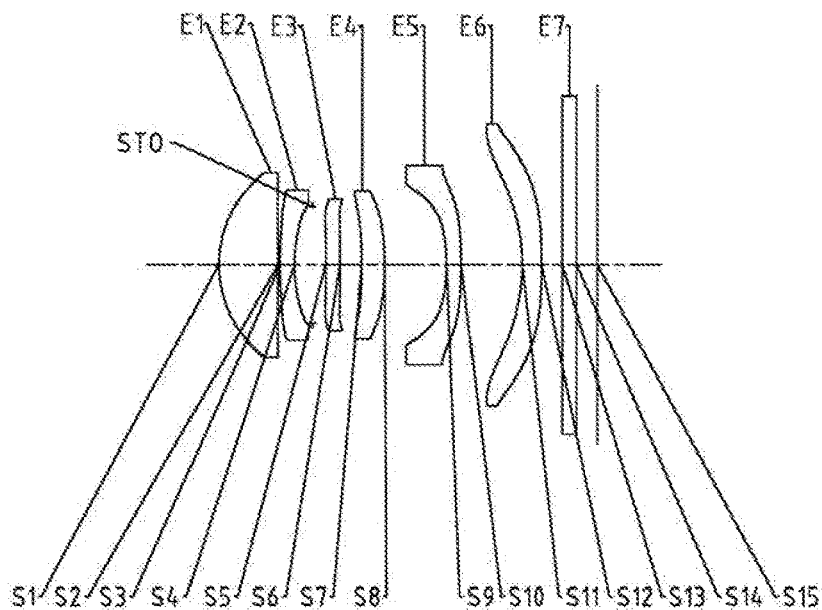
FIG. 41 shows a schematic structural diagram of an optical imaging lens assembly of Example 9.

FIG. 41 is a schematic structural diagram showing the optical imaging lens assembly of Example 9. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is convex. The second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be concave, and an image side surface S6 of the third lens E3 may be convex. The fourth lens E4 may have a positive refractive power. An object side surface S7 of the fourth lens E4 may be concave, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 25 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 25

| f1 (mm) | 3.00 | f (mm) | 6.00 |
|---|---|---|---|
| f2 (mm) | −5.40 | TTL (mm) | 5.52 |
| f3 (mm) | −140.14 | ImgH (mm) | 2.62 |
| f4 (mm) | 12.10 | | |
| f5 (mm) | −9.30 | | |
| f6 (mm) | −6.68 | | |

Table 26 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 26

| Surface No. | Surface Type | Curvature Radius | Thickness | Refractive Index | Abbe Number | Conic Coefficient |
|---|---|---|---|---|---|---|
| OBJ | Spherical | Infinite | Infinite | | | |
| S1 | Aspherical | 1.6761 | 0.8677 | 1.55 | 56.1 | 0.0733 |
| S2 | Aspherical | −62.2844 | 0.0300 | | | 64.1211 |
| S3 | Aspherical | 7.2939 | 0.2100 | 1.67 | 20.4 | 9.6846 |
| S4 | Aspherical | 2.3854 | 0.2644 | | | 0.9521 |
| STO | Spherical | Infinite | 0.1931 | | | |
| S5 | Aspherical | −74.1635 | 0.2100 | 1.55 | 56.1 | −109.8026 |
| S6 | Aspherical | −2392.2162 | 0.3152 | | | 99.0000 |
| S7 | Aspherical | −7.0304 | 0.3376 | 1.65 | 23.5 | −17.7816 |
| S8 | Aspherical | −3.7692 | 0.8962 | | | 3.1902 |
| S9 | Aspherical | −2.4885 | 0.2126 | 1.55 | 56.1 | 3.1223 |
| S10 | Aspherical | −5.0275 | 0.8866 | | | 2.6686 |
| S11 | Aspherical | −2.7513 | 0.2829 | 1.55 | 56.1 | −0.3598 |
| S12 | Aspherical | −11.5813 | 0.3017 | | | 11.4530 |
| S13 | Spherical | Infinite | 0.2100 | 1.52 | 64.2 | |
| S14 | Spherical | Infinite | 0.3019 | | | |
| S15 | Spherical | Infinite | | | | |

Table 27 below shows the high-order coefficients of each of the aspherical surfaces S1-S12 that can be used for respective aspherical lens in this example. Each aspherical surface type may be defined by formula (1) given in Example 1 above.

TABLE 27

| Surface No. | A4 | A6 | A8 | A10 | A12 | A14 | A16 |
|---|---|---|---|---|---|---|---|
| S1 | −2.8475E−03 | 3.6954E−03 | −1.2819E−02 | 2.4664E−02 | −2.6291E−02 | 1.2884E−02 | −2.5140E−03 |
| S2 | −3.7993E−02 | 2.0471E−01 | −4.6319E−01 | 5.6761E−01 | −3.7820E−01 | 1.2887E−01 | −1.7703E−02 |
| S3 | −7.5868E−02 | 2.2486E−01 | −4.7154E−01 | 5.9115E−01 | −3.4007E−01 | 6.4343E−02 | 3.9566E−03 |
| S4 | −3.1391E−02 | 9.1137E−02 | −2.7362E−01 | 8.7801E−01 | −1.3716E+00 | 1.3304E+00 | −5.5413E−01 |
| S5 | −5.8708E−03 | −1.6240E−01 | 3.1278E−01 | 2.0134E−01 | −9.2292E−02 | 1.1933E−01 | −1.0614E−01 |
| S6 | 5.2723E−02 | −2.0733E−01 | 1.6324E−01 | 7.9041E−01 | −1.7364E+00 | 1.7394E+00 | −7.0886E−01 |
| S7 | 1.5867E−02 | −1.1623E−01 | −2.3542E−01 | 1.0443E+00 | −1.5570E+00 | 1.1576E+00 | −3.4053E−01 |
| S8 | 2.2774E−02 | −8.7616E−02 | −9.0804E−02 | 3.3087E−01 | −3.8094E−01 | 2.0134E−01 | −3.4140E−02 |
| S9 | 8.5206E−02 | −3.5841E−01 | 3.0782E−01 | −1.8784E−01 | 1.4065E−02 | 6.3937E−02 | −1.9294E−02 |
| S10 | 1.1879E−01 | −3.2346E−01 | 3.2518E−01 | −2.3047E−01 | 1.1784E−01 | −3.3225E−02 | 3.6623E−03 |
| S11 | 3.4838E−03 | −1.0903E−02 | 1.4092E−02 | −7.5202E−03 | 2.3858E−03 | −3.9220E−04 | 2.5498E−05 |
| S12 | −6.3137E−02 | 1.5928E−02 | −4.0396E−03 | 2.2350E−03 | −9.1388E−04 | 1.6644E−04 | −1.0269E−05 |

Figure 42:
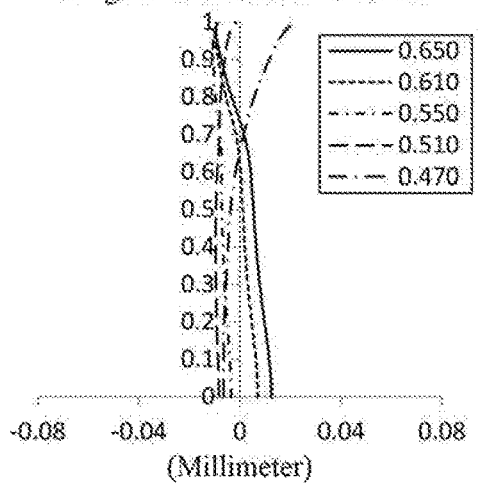
FIGS. 42 to 45 show a longitudinal aberration curve, an astigmatic curve, a distortion curve and a lateral color curve of the optical imaging lens assembly of Example 9, respectively.
Figure 43:
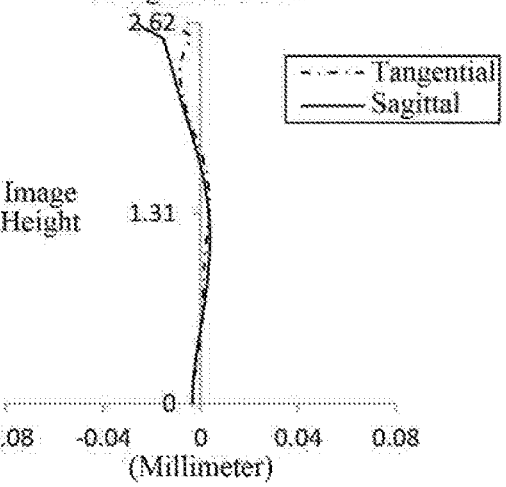
Figure 44:
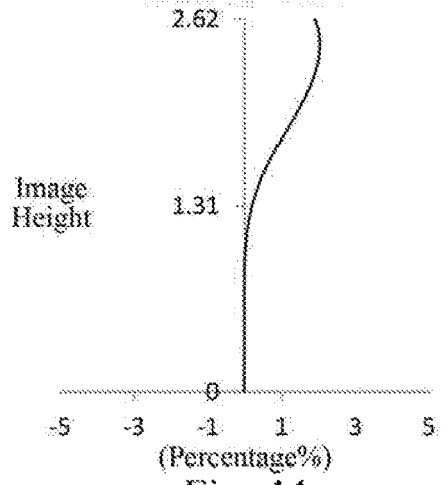
Figure 45:
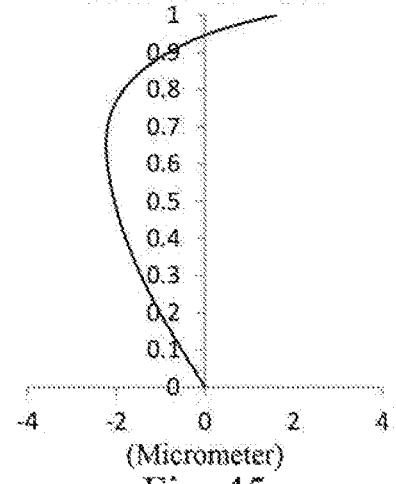

FIG. 42 illustrates a longitudinal aberration curve of the optical imaging system according to Example 9, representing deviations of focal points converged by light of different wavelengths after passing through the optical imaging system. FIG. 43 illustrates an astigmatic curve of the optical imaging system according to Example 9, representing a curvature of a tangential plane and a curvature of a sagittal plane. FIG. 44 illustrates a distortion curve of the optical imaging system according to Example 9, representing amounts of distortion corresponding to different FOVs. FIG. 45 illustrates a lateral color curve of the optical imaging system according to Example 9, representing deviations of different image heights on an image plane after light passes through the optical imaging system. It can be determined from the above description and FIGS. 42 to 45 that the optical imaging lens assembly according to Example 9 is applicable for portable electronic products, and is a telephoto optical imaging lens assembly with a long focal length and a good imaging quality.

Example 10

An optical imaging lens assembly according to Example 10 of the disclosure is described below with reference to FIGS. 46 to 50.

Figure 46:
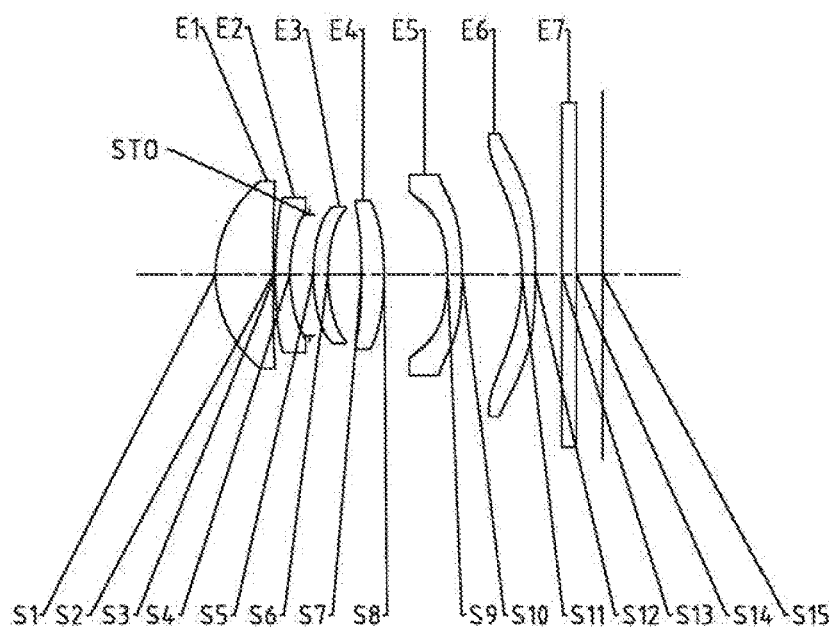
FIG. 46 shows a schematic structural diagram of an optical imaging lens assembly of Example 10.

FIG. 46 is a schematic structural diagram showing the optical imaging lens assembly of Example 10. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is concave. The second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be concave, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 28 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 28

| f1 (mm) | 3.13 | f (mm) | 6.00 |
|---|---|---|---|
| f2 (mm) | −5.05 | TTL (mm) | 5.52 |
| f3 (mm) | −4914.81 | ImgH (mm) | 2.62 |
| f4 (mm) | 11.26 | | |
| f5 (mm) | −14.66 | | |
| f6 (mm) | −6.67 | | |

Table 29 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 29

| Surface No. | Surface Type | Curvature Radius | Thickness | Material Refractive Index | Material Abbe Number | Conic Coefficient |
|---|---|---|---|---|---|---|
| OBJ | Spherical | Infinite | Infinite | | | |
| S1 | Aspherical | 1.6876 | 0.8242 | 1.55 | 56.1 | 0.0587 |
| S2 | Aspherical | 119.2281 | 0.0300 | | | 99.0000 |
| S3 | Aspherical | 6.3234 | 0.2100 | 1.67 | 20.4 | 10.4572 |
| S4 | Aspherical | 2.1685 | 0.2823 | | | 0.6295 |
| STO | Spherical | Infinite | 0.0514 | | | |
| S5 | Aspherical | 2.2113 | 0.2100 | 1.55 | 56.1 | −0.2391 |
| S6 | Aspherical | 2.1353 | 0.4785 | | | 0.2905 |
| S7 | Aspherical | −8.5036 | 0.3238 | 1.65 | 23.5 | −26.3893 |
| S8 | Aspherical | −3.9775 | 0.8990 | | | 3.0230 |
| S9 | Aspherical | −2.5170 | 0.2100 | 1.55 | 56.1 | 3.0693 |
| S10 | Aspherical | −3.7787 | 0.8469 | | | 2.1295 |
| S11 | Aspherical | −2.8349 | 0.1880 | 1.55 | 56.1 | −0.4165 |
| S12 | Aspherical | −13.1118 | 0.3779 | | | −50.5910 |
| S13 | Spherical | Infinite | 0.2100 | 1.52 | 64.2 | |
| S14 | Spherical | Infinite | 0.3781 | | | |
| S15 | Spherical | Infinite | | | | |

Table 30 below shows the high-order coefficients of each of the aspherical surfaces S1-S12 that can be used for respective aspherical lens in this example. Each aspherical surface type may be defined by formula (1) given in Example 1 above.

TABLE 30

| Surface No. | A4 | A6 | A8 | A10 | A12 | A14 | A16 |
|---|---|---|---|---|---|---|---|
| S1 | −2.7886E−03 | −3.3967E−03 | 2.3869E−03 | 4.1333E−03 | −1.0710E−02 | 6.5592E−03 | −1.3826E−03 |
| S2 | −3.3428E−02 | 1.6582E−01 | −3.6048E−01 | 4.2642E−01 | −2.7333E−01 | 8.9771E−02 | −1.1919E−02 |
| S3 | −6.7983E−02 | 1.9950E−01 | −4.0651E−01 | 5.0872E−01 | −3.1320E−01 | 7.9458E−02 | −3.7975E−03 |
| S4 | −4.0752E−02 | 1.0347E−01 | −2.0807E−01 | 5.2314E−01 | −5.7495E−01 | 3.9187E−01 | −1.4321E−01 |
| S5 | −5.8896E−02 | −1.4100E−01 | 2.2755E−01 | −2.3721E−01 | 4.7904E−01 | −5.1711E−01 | 1.9075E−01 |
| S6 | −5.9838E−02 | −3.1427E−02 | 3.1046E−01 | −5.0639E−01 | 9.3694E−01 | −8.6918E−01 | 3.0455E−01 |
| S7 | −2.6361E−02 | −2.4802E−02 | 5.0872E−03 | 9.0472E−03 | 8.1373E−02 | −1.3803E−01 | 6.4164E−02 |
| S8 | −1.3557E−02 | −3.1356E−02 | 2.6269E−02 | −1.0057E−01 | 2.2236E−01 | −2.1842E−01 | 7.9468E−02 |
| S9 | 4.7887E−02 | −2.1630E−01 | 1.0809E−01 | 7.2765E−02 | −2.0034E−01 | 1.4711E−01 | −3.0779E−02 |
| S10 | 9.0525E−02 | −2.1704E−01 | 1.9143E−01 | −1.1743E−01 | 4.8030E−02 | −7.5756E−03 | −2.2930E−04 |
| S11 | −1.6458E−03 | 5.6664E−03 | −5.1422E−03 | 3.5937E−03 | −9.8724E−04 | 1.2950E−04 | −7.4019E−06 |
| S12 | −7.0180E−02 | 3.4466E−02 | −2.1261E−02 | 1.0294E−02 | −3.0012E−03 | 4.6854E−04 | −2.9708E−05 |

Figure 47:
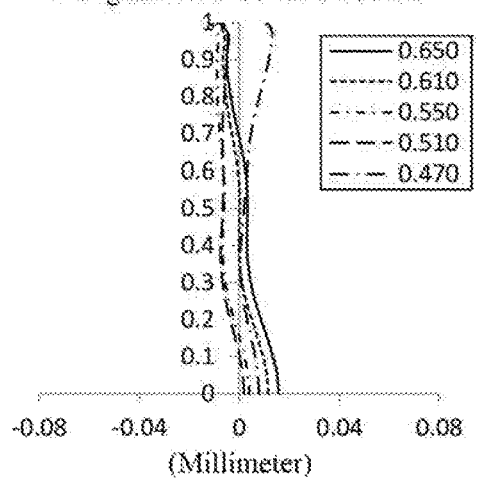
FIGS. 47 to 50 show a longitudinal aberration curve, an astigmatic curve, a distortion curve and a lateral color curve of the optical imaging lens assembly of Example 10, respectively.
Figure 48:
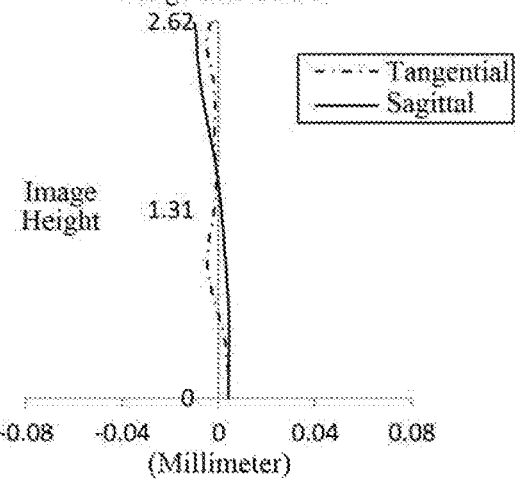
Figure 49:
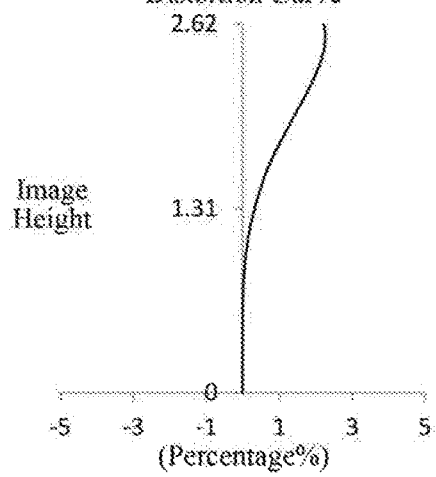
Figure 50:
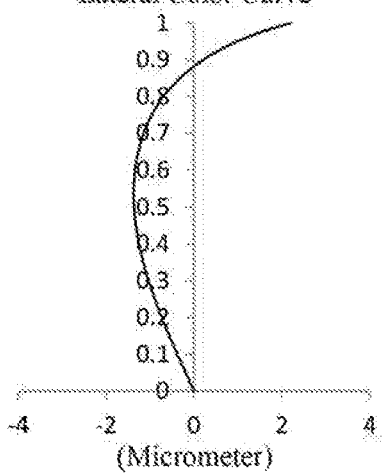

FIG. 47 illustrates a longitudinal aberration curve of the optical imaging system according to Example 10, representing deviations of focal points converged by light of different wavelengths after passing through the optical imaging system. FIG. 48 illustrates an astigmatic curve of the optical imaging system according to Example 10, representing a curvature of a tangential plane and a curvature of a sagittal plane. FIG. 49 illustrates a distortion curve of the optical imaging system according to Example 10, representing amounts of distortion corresponding to different FOVs. FIG. 50 illustrates a lateral color curve of the optical imaging system according to Example 10, representing deviations of different image heights on an image plane after light passes through the optical imaging system. It can be determined from the above description and FIGS. 47 to 50 that the optical imaging lens assembly according to Example 10 is applicable for portable electronic products, and is a telephoto optical imaging lens assembly with a long focal length and a good imaging quality.

Example 11

An optical imaging lens assembly according to Example 11 of the disclosure is described below with reference to FIGS. 51 to 55.

Figure 51:
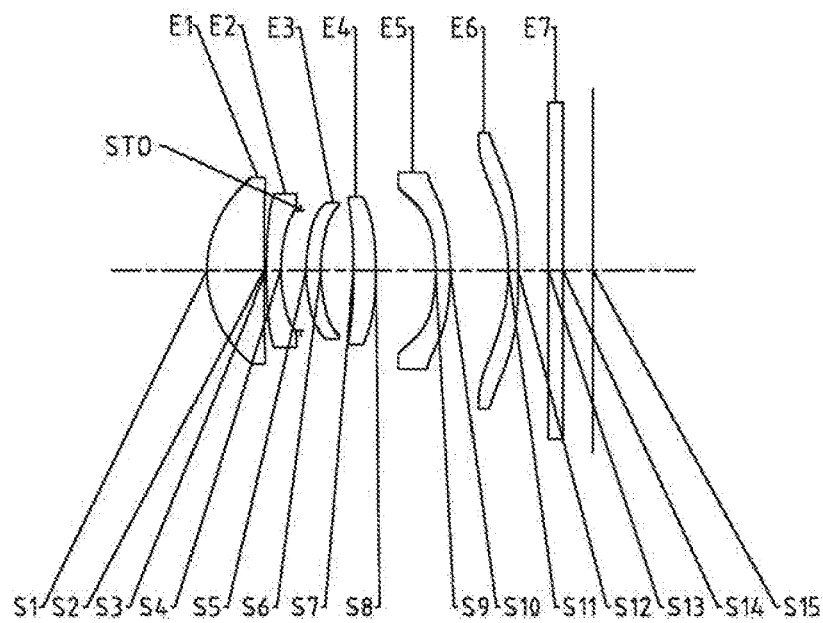
FIG. 51 shows a schematic structural diagram of an optical imaging lens assembly of Example 11.

FIG. 51 is a schematic structural diagram showing the optical imaging lens assembly of Example 11. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is concave. The to second lens E2 may have a negative refractive power. An object side surface S3 of the second lens E2 may be convex, and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be concave, and an image side surface S8 of the fourth lens E4 may be convex. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 31 below shows effective focal lengths f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 31

| f1 (mm) | 3.11 | f (mm) | 6.00 |
|---|---|---|---|
| f2 (mm) | −5.03 | TTL (mm) | 5.52 |
| f3 (mm) | −149.99 | ImgH (mm) | 2.62 |
| f4 (mm) | 11.16 | | |
| f5 (mm) | −20.49 | | |
| f6 (mm) | −6.21 | | |

Table 32 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 32

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| S1 | Aspherical | 1.6878 | 0.8193 | 1.55 | 56.1 | 0.0512 |
| S2 | Aspherical | 192.5594 | 0.0300 | | | 99.0000 |
| S3 | Aspherical | 6.4868 | 0.2100 | 1.67 | 20.4 | 12.4067 |
| S4 | Aspherical | 2.1845 | 0.2832 | | | 0.7119 |
| STO | Spherical | Infinite | 0.0808 | | | |
| S5 | Aspherical | 2.2754 | 0.2100 | 1.55 | 56.1 | −0.0425 |
| S6 | Aspherical | 2.1418 | 0.4672 | | | 0.3484 |
| S7 | Aspherical | −13.4480 | 0.3233 | 1.65 | 23.5 | −4.9183 |
| S8 | Aspherical | −4.7350 | 0.8472 | | | 5.1373 |
| S9 | Aspherical | −2.5486 | 0.2100 | 1.55 | 56.1 | 3.0765 |
| S10 | Aspherical | −3.3962 | 0.8254 | | | 1.3869 |
| S11 | Aspherical | −2.8460 | 0.1409 | 1.55 | 56.1 | −0.5361 |
| S12 | Aspherical | −18.0095 | 0.4312 | | | −120.0000 |
| S13 | Spherical | Infinite | 0.2100 | 1.52 | 64.2 | |
| S14 | Spherical | Infinite | 0.4314 | | | |
| S15 | Spherical | Infinite | | | | |

Table 33 below shows the high-order coefficients of each of the aspherical surfaces S1-S12 that can be used for respective aspherical lens in this example. Each aspherical surface type may be defined by formula (1) given in Example 1 above.

TABLE 33

| Surface No. | A4 | A6 | A8 | A10 | A12 | A14 | A16 |
|---|---|---|---|---|---|---|---|
| S1 | −2.5364E−03 | −3.9364E−03 | 2.7345E−03 | 3.4934E−03 | −1.0852E−02 | 7.1167E−03 | −1.6038E−03 |
| S2 | −3.0673E−02 | 1.5615E−01 | −3.4769E−01 | 4.2602E−01 | −2.8387E−01 | 9.7024E−02 | −1.3437E−02 |
| S3 | −7.3737E−02 | 2.2191E−01 | −4.4660E−01 | 5.7742E−01 | −3.8852E−01 | 1.1992E−01 | −1.1886E−02 |
| S4 | −5.3330E−02 | 1.5281E−01 | −2.6685E−01 | 5.4802E−01 | −5.2024E−01 | 2.7559E−01 | −7.9626E−02 |
| S5 | −8.3879E−02 | 6.2344E−02 | 1.3916E−01 | −4.6385E−01 | 1.0865E−01 | −1.9213E−01 | 9.1885E−02 |
| S6 | −8.7916E−02 | 2.9547E−02 | 3.0122E−01 | −5.5438E−01 | 1.0126E+00 | −9.7740E−01 | 3.7745E−01 |
| S7 | −3.6339E−02 | −2.3364E−02 | 1.1298E−02 | 3.5730E−02 | 1.2758E−02 | −7.6196E−02 | 4.4473E−02 |
| S8 | −2.6493E−02 | −3.2959E−02 | 2.2748E−02 | −6.3558E−02 | 1.6227E−01 | −1.7478E−01 | 6.8525E−02 |
| S9 | 6.3040E−02 | −2.8189E−01 | 2.2608E−01 | −1.0131E−01 | −6.7945E−02 | 1.2036E−01 | −3.6456E−02 |
| S10 | 1.1219E−01 | −2.5843E−01 | 2.3914E−01 | −1.7643E−01 | 1.0039E−01 | −2.9222E−02 | 2.9479E−03 |
| S11 | −1.0485E−01 | 3.5481E−02 | −4.2913E−02 | 2.7575E−02 | −8.9140E−03 | 1.4562E−03 | −9.7550E−05 |
| S12 | −8.2981E−02 | 6.0861E−02 | −4.7029E−02 | 2.4342E−02 | −7.2754E−03 | 1.1665E−03 | −7.7903E−05 |

Figure 52:
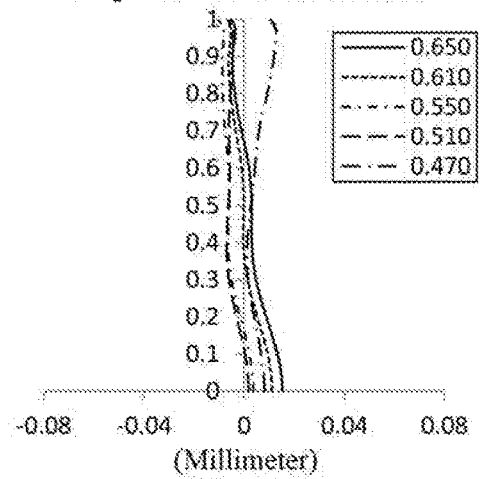
FIGS. 52 to 55 show a longitudinal aberration curve, an astigmatic curve, a distortion curve and a lateral color curve of the optical imaging lens assembly of Example 11, respectively.
Figure 53:
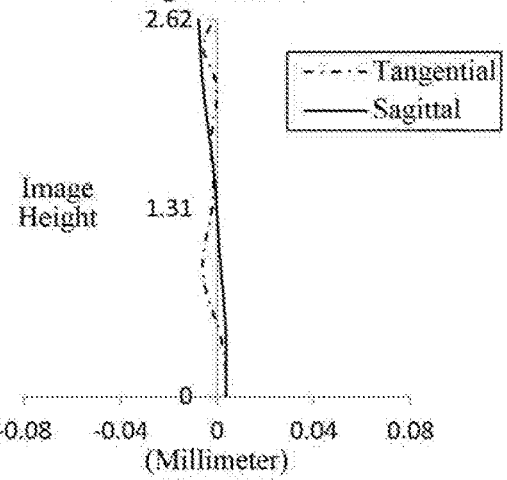
Figure 54:
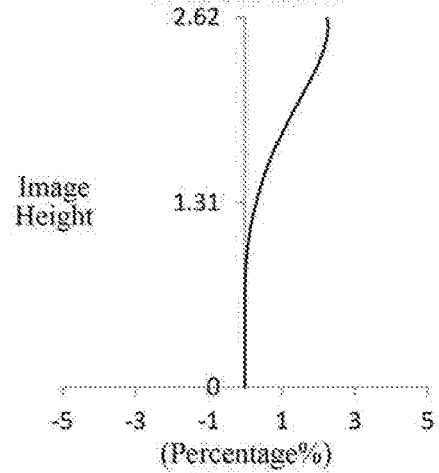
Figure 55:
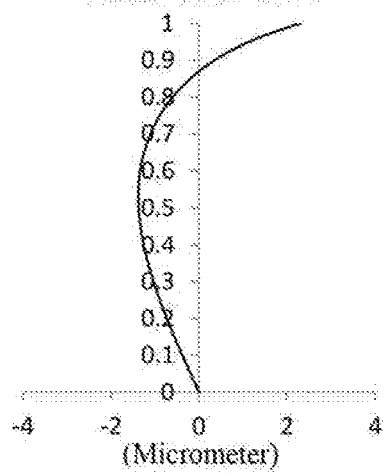

FIG. 52 illustrates a longitudinal aberration curve of the optical imaging system according to Example 11, representing deviations of focal points converged by light of different wavelengths after passing through the optical imaging system. FIG. 53 illustrates an astigmatic curve of the optical imaging system according to Example 11, representing a curvature of a tangential plane and a curvature of a sagittal plane. FIG. 54 illustrates a distortion curve of the optical imaging system according to Example 11, representing amounts of distortion corresponding to different FOVs. FIG. 55 illustrates a lateral color curve of the optical imaging system according to Example 11, representing deviations of different image heights on an image plane after light passes through the optical imaging system. It can be determined from the above description and FIGS. 52 to 55 that the optical imaging lens assembly according to Example 11 is applicable for portable electronic products, and is a telephoto optical imaging lens assembly with a long focal length and a good imaging quality.

Example 12

An optical imaging lens assembly according to Example 12 of the disclosure is described below with reference to FIGS. 56 to 60.

Figure 56:
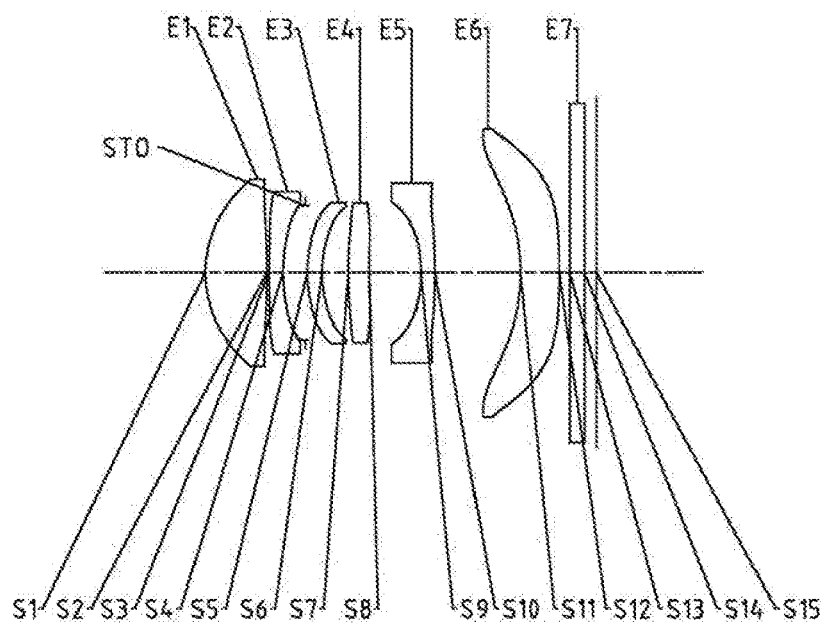
FIG. 56 shows a schematic structural diagram of an optical imaging lens assembly of Example 12.

FIG. 56 is a schematic structural diagram showing the optical imaging lens assembly of Example 12. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex, and an image side surface S2 of the first lens E1 is convex. The second lens E2 may have a negative refractive power. An object side surface S3 of the second lens E2 may be convex and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a negative refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be convex.

Table 34 below shows effective focal length f1 to f6 of the first lens E1 to the sixth lens E6, a total effective focal length f of the optical imaging lens assembly, a total length TTL of the optical imaging lens assembly, and half of a diagonal length ImgH of an effective pixel region on an electronic photosensitive element.

TABLE 34

| f1 (mm) | 2.74 | f (mm) | 6.83 |
|---|---|---|---|
| f2 (mm) | −4.61 | TTL (mm) | 5.58 |
| f3 (mm) | −34.46 | ImgH (mm) | 2.52 |
| f4 (mm) | 15.63 | | |
| f5 (mm) | −6.00 | | |
| f6 (mm) | −6.00 | | |

Table 35 below shows the surface type, curvature radius, thickness, refractive index, abbe number, and conic coefficient of each lens in the optical imaging lens assembly of this example, wherein both the curvature radius and the thickness are expressed in millimeters (mm).

TABLE 35

| Surface No. | Surface Type | Curvature Radius | Thickness | Refractive Index | Abbe Number | Conic Coefficient |
|---|---|---|---|---|---|---|
| OBJ | Spherical | Infinite | Infinite | | | |
| S1 | Aspherical | 1.6695 | 0.8806 | 1.55 | 56.1 | 0.0565 |
| S2 | Aspherical | −11.9011 | 0.0300 | | | −120.0000 |
| S3 | Aspherical | 13.9463 | 0.2021 | 1.67 | 20.4 | 24.7165 |
| S4 | Aspherical | 2.5083 | 0.3167 | | | 0.2647 |
| STO | Spherical | Infinite | 0.0300 | | | |
| S5 | Aspherical | 1.8960 | 0.2095 | 1.55 | 56.1 | −0.6403 |
| S6 | Aspherical | 1.6553 | 0.3771 | | | −0.0644 |
| S7 | Aspherical | 7.0737 | 0.2987 | 1.65 | 23.5 | 37.7731 |
| S8 | Aspherical | 23.2810 | 0.7309 | | | −120.0000 |
| S9 | Aspherical | −2.3156 | 0.2000 | 1.55 | 56.1 | 3.4125 |
| S10 | Aspherical | −8.1237 | 1.2157 | | | −118.7955 |
| S11 | Aspherical | −2.8279 | 0.5526 | 1.55 | 56.1 | −0.2240 |
| S12 | Aspherical | −22.1219 | 0.1530 | | | 99.0000 |
| S13 | Spherical | Infinite | 0.2100 | 1.52 | 64.2 | |
| S14 | Spherical | Infinite | 0.1682 | | | |
| S15 | Spherical | Infinite | | | | |

Table 36 below shows the high-order coefficients of each of the aspherical surfaces S1-S12 that can be used for respective aspherical lens in this example. Each aspherical surface type may be defined by formula (1) given in Example 1 above.

TABLE 36

| Surface No. | A4 | A6 | A8 | A10 | A12 | A14 | A16 |
|---|---|---|---|---|---|---|---|
| S1 | 8.5117E−04 | −1.8482E−02 | 3.1112E−02 | −2.4152E−02 | 4.4939E−03 | 2.5201E−03 | −1.0997E−03 |
| S2 | −3.5027E−02 | 1.7441E−01 | −3.6178E−01 | 4.0523E−01 | −2.4537E−01 | 7.5886E−02 | −9.4888E−03 |
| S3 | 0.0000E+00 | 0.0000E+00 | 0.0000E+00 | 0.0000E+00 | 0.0000E+00 | 0.0000E+00 | 0.0000E+00 |
| S4 | −3.1250E−02 | 4.9609E−02 | −1.0545E−01 | 2.8410E−01 | −1.9113E−01 | 6.3719E−02 | −1.7940E−02 |
| S5 | −3.9157E−02 | −4.0638E−02 | 6.1384E−02 | 2.9222E−01 | −3.6864E−01 | 2.1898E−01 | −6.2908E−02 |
| S6 | −6.3688E−02 | 7.8592E−02 | −4.9355E−01 | 1.8635E+00 | −2.9283E+00 | 2.4511E+00 | −8.2876E−01 |
| S7 | −4.2628E−03 | −6.1188E−02 | 1.9415E−01 | −5.6901E−01 | 8.8250E−01 | −7.2391E−01 | 2.5173E−01 |
| S8 | −1.4353E−02 | −3.6324E−02 | 1.2865E−01 | −5.5788E−01 | 9.8494E−01 | −8.5757E−01 | 3.0077E−01 |
| S9 | −6.3937E−02 | −9.7166E−02 | 3.8378E−01 | −6.9034E−01 | 6.1231E−01 | −2.7006E−01 | 5.0315E−02 |
| S10 | −4.5236E−02 | −1.3707E−02 | 2.0128E−01 | −3.1864E−01 | 2.6040E−01 | −1.0846E−01 | 1.7733E−02 |
| S11 | −8.9936E−04 | −1.2139E−02 | 1.5986E−02 | −8.1105E−03 | 2.4437E−03 | −3.9143E−04 | 2.5403E−05 |
| S12 | −6.0637E−02 | 1.2328E−03 | 3.5466E−03 | −2.8198E−03 | 1.2693E−03 | −2.9882E−04 | 2.7792E−05 |

Figure 57:
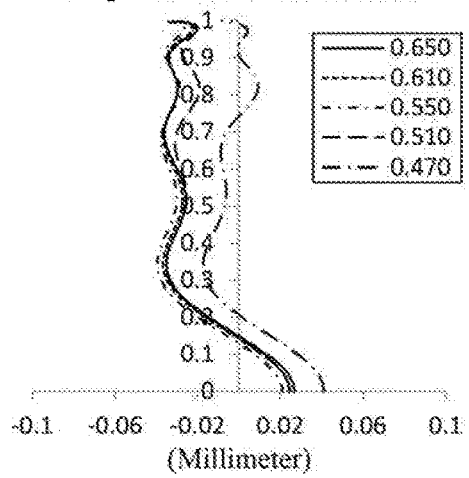
FIGS. 57 to 60 show a longitudinal aberration curve, an astigmatic curve, a distortion curve and a lateral color curve of the optical imaging lens assembly of Example 12, respectively.
Figure 58:
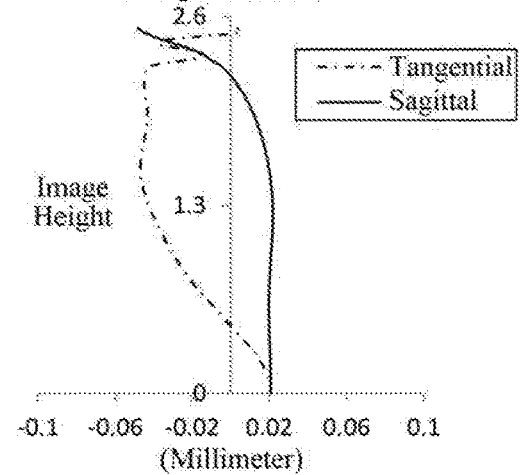
Figure 59:
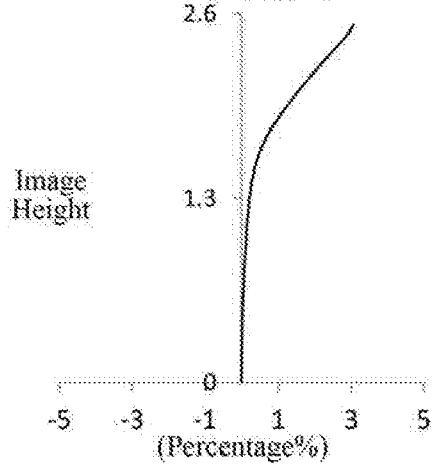
Figure 60:
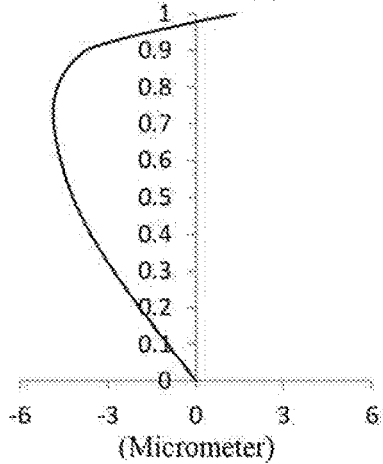

FIG. 57 illustrates a longitudinal aberration curve of the optical imaging system according to Example 12, representing deviations of focal points converged by light of different wavelengths after passing through the optical imaging system. FIG. 58 illustrates an astigmatic curve of the optical imaging system according to Example 12, representing a curvature of a tangential plane and a curvature of a sagittal plane. FIG. 59 illustrates a distortion curve of the optical imaging system according to Example 12, representing amounts of distortion corresponding to different FOVs. FIG. 60 illustrates a lateral color curve of the optical imaging system according to Example 12, representing deviations of different image heights on an image plane after light passes through the optical imaging system. It can be determined from the above description and FIGS. 57 to 60 that the optical imaging lens assembly according to Example 12 is applicable for portable electronic products, and is a telephoto optical imaging lens assembly with a long focal length and a good imaging quality.

In summary, various conditional expressions in Examples 1 to 12 above have values listed in Table 37 below.

TABLE 37

| Item/Example | 1 | 2 | 3 | 4 | 5 | 6 |
|---|---|---|---|---|---|---|
| HFOV (°) | 23.2 | 23.2 | 23.2 | 23.2 | 23.2 | 23.2 |
| f5/f6 | 1.25 | 1.51 | 1.43 | 1.31 | 1.28 | 1.08 |
| (\|SAG11 + SAG22\| + \|SAG51 + SAG61\|)/TD | 0.41 | 0.32 | 0.46 | 0.40 | 0.47 | 0.42 |
| T56/Σ AT | 0.33 | 0.33 | 0.47 | 0.39 | 0.51 | 0.40 |
| \|1/f2 + 1/f3\|/\|1/f1 + 1/f4\| | 0.47 | 0.51 | 0.63 | 0.50 | 0.61 | 0.58 |
| (R9 + R10)/(R11 + R12) | 0.64 | −0.54 | 1.48 | 0.46 | 2.14 | 2.67 |
| SD12/SD52 | 0.86 | 0.81 | 0.82 | 0.88 | 0.99 | 0.91 |
| (R1 + R2)/(R1 − R2) | −1.04 | −0.90 | −0.73 | −1.07 | −0.73 | −0.89 |
| TTL/f | 0.92 | 0.93 | 0.91 | 0.92 | 0.91 | 0.91 |
| f/R4 − f/R5 | −0.07 | −0.50 | −0.78 | −0.18 | −0.53 | −0.52 |
| T34/T45 | 0.48 | 0.48 | 0.39 | 0.45 | 0.48 | 0.49 |
| f1*f6/f4 (mm) | −2.15 | −2.06 | −2.90 | −2.74 | −2.63 | −2.87 |
| (CT2 + CT3)/(CT1 + CT5) | 0.40 | 0.41 | 0.38 | 0.41 | 0.38 | 0.36 |

| Item/Embodiment | 7 | 8 | 9 | 10 | 11 | 12 |
|---|---|---|---|---|---|---|
| HFOV (°) | 23.3 | 23.2 | 23.2 | 23.2 | 23.2 | 19.9 |
| f5/f6 | 1.07 | 1.32 | 1.39 | 2.20 | 3.30 | 1.00 |
| (\|SAG11 + SAG22\| + \|SAG51 + SAG61\|)/TD | 0.34 | 0.38 | 0.42 | 0.41 | 0.41 | 0.36 |
| T56/Σ AT | 0.37 | 0.35 | 0.34 | 0.33 | 0.33 | 0.45 |
| \|1/f2 + 1/f3\|/\|1/f1 + 1/f4\| | 0.11 | 0.56 | 0.46 | 0.49 | 0.50 | 0.57 |
| (R9 + R10)/(R11 + R12) | 1.05 | 0.57 | 0.52 | 0.39 | 0.29 | 0.42 |
| SD12/SD52 | 0.81 | 0.84 | 0.85 | 0.85 | 0.86 | 0.98 |
| (R1 + R2)/(R1 − R2) | −1.37 | −0.73 | −0.95 | −1.03 | −1.02 | −0.75 |
| TTL/f | 0.92 | 0.92 | 0.92 | 0.92 | 0.92 | 0.82 |
| f/R4 − f/R5 | −0.36 | −0.60 | −0.08 | −0.10 | −0.16 | −0.52 |
| T34/T45 | 0.32 | 0.38 | 0.35 | 0.53 | 0.55 | 0.52 |
| f1*f6/f4 (mm) | −0.75 | −2.09 | −1.66 | −1.85 | −1.73 | −1.05 |
| (CT2 + CT3)/(CT1 + CT5) | 0.56 | 0.39 | 0.39 | 0.41 | 0.41 | 0.38 |

The foregoing is only a description of the preferred examples of the disclosure and the applied technical principles. It should be appreciated by those skilled in the art that the scope of the invention involved in the disclosure is not limited to the technical solutions formed by the particular combinations of the above technical features. The scope of the invention should also cover other technical solutions obtained by any combinations of the above technical features or equivalent features thereof without departing from the concept of the invention, such as, technical solutions formed by replacing the features as disclosed in the disclosure with (but not limited to), technical features with similar functions.

What is claimed is:

1. An optical imaging lens assembly, sequentially from an object side to an image side of the optical imaging lens assembly, comprising:
    a first lens with a positive refractive power and a convex object side surface;
    a second lens with a refractive power and a concave image side surface;
    a third lens with a refractive power;
    a fourth lens with a positive refractive power;
    a fifth lens with a negative refractive power and a concave object side surface; and
    a sixth lens with a negative refractive power and a concave object side surface,
    wherein a space interval T34 between the third lens and the fourth lens along an optical axis and a space interval T45 between the fourth lens and the fifth lens along the optical axis satisfy 0.2<T34/T45<0.6, and
    wherein half of a maximum field of view HFOV of the optical imaging lens assembly satisfies HFOV≤25°.

2. The optical imaging lens assembly according to claim 1, wherein half of a maximum field of view HFOV of the optical imaging lens assembly satisfies HFOV≤23.3°.

3. The optical imaging lens assembly according to claim 2, wherein an effective focal length f5 of the fifth lens and an effective focal length f6 of the sixth lens satisfy 1≤f5/f6<4.

4. The optical imaging lens assembly according to claim 1, wherein a space interval T56 between the fifth lens and the sixth lens along the optical axis and a sum ΣAT of space intervals along the optical axis between any two adjacent lenses having the refractive power among the first lens to the sixth lens satisfy T56/ΣAT<0.6.

5. The optical imaging lens assembly according to claim 1, wherein an effective focal length f1 of the first lens, an effective focal length f2 of the second lens, an effective focal length f3 of the third lens, and an effective focal length f4 of the fourth lens satisfy |1/f2+1/f3|/|1/f1+1/f4|<1.

6. The optical imaging lens assembly according to claim 1, wherein a curvature radius R9 of the object side surface of the fifth lens, a curvature radius R10 of an image side surface of the fifth lens, a curvature radius R11 of the object side surface of the sixth lens, and the curvature radius R12 of an image side surface of the sixth lens satisfy −1<(R9+R10)/(R11+R12)<3.

7. The optical imaging lens assembly according to claim 1, wherein a curvature radius R1 of the object side surface of the first lens and a curvature radius R2 of an image side surface of the first lens satisfy −1.5<(R1+R2)/(R1−R2)<−0.5.

8. The optical imaging lens assembly according to claim 1, wherein a distance TTL along the optical axis from the object side surface of the first lens to an imaging surface and an effective focal length f of the optical imaging system satisfy TTL/f<1.

9. The optical imaging lens assembly according to claim 1, wherein (|SAG11+SAG22|+|SAG51+SAG61|)/TD<0.5 is satisfied, where SAG11 is a distance along the optical axis from an intersection of the object side surface of the first lens and the optical axis to a vertex of a maximum effective radius of the object side surface of the first lens, SAG22 is a distance along the optical axis from an intersection of the image side surface of the second lens and the optical axis to a vertex of a maximum effective radius of the image side surface of the second lens, SAG51 is a distance along the optical axis from an intersection of the object side surface of the fifth lens and the optical axis to a vertex of a maximum effective radius of the object side surface of the fifth lens, SAG61 is a distance along the optical axis from an intersection of the object side surface of the sixth lens and the optical axis to a vertex of a maximum effective radius of the object side surface of the sixth lens, and TD is a distance between the object side surface of the first lens to an image side surface of the sixth lens along the optical axis.

10. The optical imaging lens assembly according to claim 1, wherein an effective focal length f1 of the first lens, an effective focal length f4 of the fourth lens, and an effective focal length f6 of the sixth lens satisfy −3 mm<f1*f6/f4<−0.5 mm.

11. The optical imaging lens assembly according to claim 1, wherein a central thickness CT1 of the first lens, a central thickness CT2 of the second lens, a central thickness CT3 of the third lens, and a central thickness CT5 of the fifth lens satisfy (CT2+CT3)/(CT1+CT5)<0.6.

12. An optical imaging lens assembly, sequentially from an object side to an image side of the optical imaging lens assembly, comprising:
a first lens with a positive refractive power and a convex object side surface;
a second lens with a refractive power and a concave image side surface;
a third lens with a refractive power;
a fourth lens with a positive refractive power;
a fifth lens with a negative refractive power and a concave object side surface; and
a sixth lens with a negative refractive power and a concave object side surface,
wherein an effective focal length f of the optical imaging lens assembly, a curvature radius R4 of the image side surface of the second lens, and a curvature radius R5 of an object side surface of the third lens satisfy −1<f/R4−f/R5<0, and
wherein half of a maximum field of view HFOV of the optical imaging lens assembly satisfies HFOV≤25°.

13. The optical imaging lens assembly according to claim 12, wherein half of a maximum field of view HFOV of the optical imaging lens assembly satisfies HFOV≤23.3°.

14. The optical imaging lens assembly according to claim 12, wherein a curvature radius R9 of the object side surface of the fifth lens, a curvature radius R10 of an image side surface of the fifth lens, a curvature radius R11 of the object side surface of the sixth lens, and the curvature radius R12 of an image side surface of the sixth lens satisfy −1<(R9+R10)/(R11+R12)<3.

15. The optical imaging lens assembly according to claim 12, wherein a curvature radius R1 of the object side surface of the first lens and a curvature radius R2 of an image side surface of the first lens satisfy −1.5<(R1+R2)/(R1−R2)<−0.5.

16. An optical imaging lens assembly, sequentially from an object side to an image side of the optical imaging lens assembly, comprising:
a first lens with a positive refractive power and a convex object side surface;
a second lens with a refractive power and a concave image side surface;
a third lens with a refractive power;
a fourth lens with a positive refractive power;
a fifth lens with a negative refractive power and a concave object side surface; and
a sixth lens with a negative refractive power and a concave object side surface, wherein a maximum effective radius SD12 of an image side surface of the first lens and a maximum effective radius SD52 of an image side surface of the fifth lens satisfy 0.5<SD12/SD52<1.

17. The optical imaging lens assembly according to claim 16, wherein an effective focal length f5 of the fifth lens and an effective focal length f6 of the sixth lens satisfy 1≤f5/f6<4.

18. The optical imaging lens assembly according to claims 16, wherein a space interval T56 between the fifth lens and the sixth lens along an optical axis and a sum ΣAT of space intervals along the optical axis between any two adjacent lenses having the refractive power among the first lens to the sixth lens satisfy T56/ΣAT<0.6.

19. The optical imaging lens assembly according to claim 16, wherein an effective focal length f1 of the first lens, an effective focal length f2 of the second lens, an effective focal length f3 of the third lens, and an effective focal length f4 of the fourth lens satisfy |1/f2+1/f3|/|1/f1+1/f4|<1.

20. The optical imaging lens assembly according to claim 16, wherein an effective focal length f1 of the first lens, an effective focal length f4 of the fourth lens, and an effective focal length f6 of the sixth lens satisfy −3<f1*f6/f4<−0.5.

* * * * *